United States Patent [19]

Broekhuijsen

[11] Patent Number: 5,694,535

[45] Date of Patent: Dec. 2, 1997

[54] DIRECT INTERACTIVE, CONSTANT-TIME CURVE APPARATUS AND METHOD

[75] Inventor: Jerome A. Broekhuijsen, Orem, Utah

[73] Assignee: Novell, Inc., Provo, Utah

[21] Appl. No.: 410,274

[22] Filed: Mar. 24, 1995

[51] Int. Cl.$^6$ .................................................. G06T 11/00
[52] U.S. Cl. ........................................................... 395/142
[58] Field of Search .................................. 395/142, 143, 395/150, 151, 155, 161, 167, 168, 169, 171, 326

[56] References Cited

U.S. PATENT DOCUMENTS

| | | | |
|---|---|---|---|
| 4,674,058 | 6/1987 | Lindbloom et al. | 395/141 |
| 5,363,479 | 11/1994 | Olynyk | 395/142 |
| 5,367,617 | 11/1994 | Goossen et al. | 395/142 |
| 5,381,521 | 1/1995 | Ballard | 395/142 |
| 5,412,770 | 5/1995 | Yamashita et al. | 395/142 |
| 5,473,742 | 12/1995 | Polyakov et al. | 395/142 |
| 5,583,977 | 12/1996 | Seidl | 395/133 |

FOREIGN PATENT DOCUMENTS

| | | |
|---|---|---|
| 0469918 A2 | 2/1992 | European Pat. Off. . |
| 5412770 | 8/1993 | European Pat. Off. . |
| 0626648 A1 | 11/1994 | European Pat. Off. . |
| 2248754 | 4/1992 | United Kingdom . |

OTHER PUBLICATIONS

Farin "Curves and Surfaces for Computer Aided Geometric Design" (1993) pp. 189–225.

Abdelmalek, Nabih N. "Piecewise Linear Least–Squares Approximation of Planar Curves" *Int. J. Systems Sci*, Taylor & Francis Ltd., 1990, vol. 21, No. 7, pp. 1393–1403.

Banks, et al. "Realtime Spline Curves from Interactively Sketched Data" Association for Computer Machinery, 1990.

Baudel, Thomas "A Mark–Based Interaction Paradigm for Free–Hand Drawing" Association for Computer Machinery, Nov. 2–4, 1994, pp. 185–192.

Cohen, Elain "Realtime Pipelined Spline Data Fitting for Sketched Curves" *Curves and Surfaces*, Academic Press, Boston, 1991, pp. 91–102.

Elhay, et al. "Updating and Downdating of Orthogonal Polynomials with Data Fitting Applications" pp. 327–353, Society for Industrial and Applied Mathematics, 1991.

Hsu, et al. "Direct Manipulation of Free–Form Deformations" *Computer Graphics*, Association of Computer Machinery, Jul. 2, 1992, pp. 177–182.

Jensen, et al. "Practical Curves and Surfaces for a Geometric Modeler" pp. 357–359, Elsevier Science Publishers B.V., 1991.

Piegl, L. "Modifying the Shape of Rational B–Splines. Part 1: Curves" Department of Computer Science & Engineering, University of South Florida.

(List continued on next page.)

*Primary Examiner*—Almis R. Jankus
*Attorney, Agent, or Firm*—Broadbent, Hulse, Pierce & Pate

[57] ABSTRACT

A method and apparatus for creating a curve to be displayed on an output device operates to interactively and directly specify the curve from input signals generated by an input device in response to control by a user. An apparatus may include an input device having a pointer for inputting points along a path-defined curve specified directly (using actual input points intended to be approximately on the curve) by a user. A processor outputs to an output device certain rendering data for rendering an image of the curve in real time for feeding back to a user. The user may augment (edit, extend) the curve by moving the pointer to add input points to the curve, based on the image fed back. The apparatus and method map non-linear coefficients of dependent control variables onto "building variables" selected to combine in linear combinations to replace the non-linear coefficients. When new inputs are added, building variables are linearly transformed to new values, rather than being re-calculated from original non-linear summation terms. The curve is rendered on an output device and fed back immediately to a user in real time as the user adapts the curve displayed by moving the pointer to add inputs.

23 Claims, 26 Drawing Sheets

OTHER PUBLICATIONS

Plass, et al. "Curve-Fitting with Piecewise Parametric Cubics" *Computer Graphics*, Association for Computer Machinery, 1983, pp. 229–239.

Pratt, Vaughan "Direct Least-Squares Fitting of Algebraic Surfaces" *Computer Graphics*, Association of Computer Machinery, 1987, pp. 145–152.

Robertson, et al. "The Cognitive Coprocessor Architecture for Interactive User Interfaces" Association for Computer Machinery, 1989, pp. 10–18.

Saund, et al. "A Perceptually-Supported Sketch Editor" Association for Computer Machinery, Nov. 2–4, 1994, pp. 175–184.

Schneider, Philip J. "Phoenix: An Interactive Curve Design System Based on the Automatic Fitting of Hand-Sketched Curves" Master's Thesis, University of Washington, 1988.

$$\mathbf{Bez}(t) = u^3 \mathbf{A}_0 + 3tu^2 \mathbf{C}_0 + 3t^2 u \mathbf{C}_1 + t^3 \mathbf{A}_1 \quad (1)$$

$$ChordLength = \sum_{i=2}^{n} \|\mathbf{P}_i - \mathbf{P}_{i-1}\| \quad (2)$$

$$\mathbf{kv}_i = \begin{cases} 0 & i = 1 \\ \dfrac{\sum_{j=2}^{i} \|\mathbf{P}_j - \mathbf{P}_{j-1}\|}{ChordLength} & 1 < i < n \\ 1 & i = n \end{cases} \quad (3)$$

Fig. 12

$$TotSqErr = \sum_{i=1}^{n} \|\mathbf{Bez}(t_i) - \mathbf{P}_i\|^2$$

$$= \sum_{i=1}^{n} (u_i^3 \mathbf{A}_{0x} + 3t_i u_i^2 \mathbf{C}_{0x} + 3t_i^2 u_i \mathbf{C}_{1x} + t_i^3 \mathbf{A}_{1x} - \mathbf{P}_{i,x})^2$$

$$+ \sum_{i=1}^{n} (u_i^3 \mathbf{A}_{0y} + 3t_i u_i^2 \mathbf{C}_{0y} + 3t_i^2 u_i \mathbf{C}_{1y} + t_i^3 \mathbf{A}_{1y} - \mathbf{P}_{i,y})^2 \quad (4)$$

$$\frac{\partial}{\partial \mathbf{C}_0} TotSqErr = 0 \rightarrow$$

$$3\mathbf{C}_0 \sum_{i=1}^{n} t_i^2 u_i^4 + 3\mathbf{C}_1 \sum_{i=1}^{n} t_i^3 u_i^3 = \sum_{i=1}^{n} \mathbf{P}_i t_i u_i^2 - \mathbf{A}_0 \sum_{i=1}^{n} t_i u_i^5 - \mathbf{A}_1 \sum_{i=1}^{n} t_i^4 u_i^2 \quad (5)$$

$$\frac{\partial}{\partial \mathbf{C}_1} TotSqErr = 0 \rightarrow$$

$$3\mathbf{C}_0 \sum_{i=1}^{n} t_i^3 u_i^3 + 3\mathbf{C}_1 \sum_{i=1}^{n} t_i^4 u_i^2 = \sum_{i=1}^{n} \mathbf{P}_i t_i^2 u_i - \mathbf{A}_0 \sum_{i=1}^{n} t_i^2 u_i^4 - \mathbf{A}_1 \sum_{i=1}^{n} t_i^5 u_i \quad (6)$$

$$s_i = \begin{cases} 0 & i = 1 \\ \sum_{j=2}^{i} \|\mathbf{P}_j - \mathbf{P}_{j-1}\| & 1 < i < n \\ \alpha \phantom{xxx} \leftarrow_{414} & i = n \end{cases} \quad (8)$$

$$t_i = \mathbf{k}\mathbf{v}_i = \frac{s_i}{\alpha} \quad (9)$$

$$u_i = 1 - t_i = \frac{\alpha - s_i}{\alpha} \quad (10)$$

$$t_i^a u_i^b = \left(\frac{s_i}{\alpha}\right)^a \left(\frac{\alpha - s_i}{\alpha}\right)^b$$
$$= \frac{1}{\alpha^{a+b}} \left[ s_i^a (\alpha - s_i)^b \right] \quad (11)$$

$$\overbrace{\sum_{i=1}^{n} t_i^a u_i^b}^{436} = \frac{1}{\alpha^{a+b}} \sum_{i=1}^{n} s_i^a (\alpha - s_i)^b \quad (12)$$

$$\sum_{i=1}^{n} t_i^3 u_i^3 = \frac{1}{\alpha^{3+3}} \sum_{i=1}^{n} s_i^3 (\alpha - s_i)^3$$
$$= \frac{1}{\alpha^6} \sum_{i=1}^{n} \left[ 1\alpha^3 s_i^3 - 3\alpha^2 s_i^4 + 3\alpha^1 s_i^5 - 1\alpha^0 s_i^6 \right] \quad (13)$$
$$= 1\sum_{i=1}^{n} \left(\frac{s_i}{\alpha}\right)^3 - 3\sum_{i=1}^{n} \left(\frac{s_i}{\alpha}\right)^4 + 3\sum_{i=1}^{n} \left(\frac{s_i}{\alpha}\right)^5 - 1\sum_{i=1}^{n} \left(\frac{s_i}{\alpha}\right)^6$$

*Fig. 14*

$$q_a = \sum_{i=1}^{n} \left(\frac{s_i}{\alpha}\right)^a \quad (14)$$

*414*

*436*

$$\sum_{i=1}^{n} t_i^1 u_i^5 = 1q_1 - 5q_2 + 10q_3 - 10q_4 + 5q_5 - 1q_6$$

$$\sum_{i=1}^{n} t_i^2 u_i^4 = 1q_2 - 4q_3 + 6q_4 - 4q_5 + 1q_6$$

$$\sum_{i=1}^{n} t_i^3 u_i^3 = 1q_3 - 3q_4 + 3q_5 - 1q_6 \quad (15)$$

$$\sum_{i=1}^{n} t_i^4 u_i^2 = 1q_4 - 2q_5 + 1q_6$$

$$\sum_{i=1}^{n} t_i^5 u_i^1 = 1q_5 - 1q_6$$

Fig. 15

$$\sum_{i=1}^{n} P_i t_i^a u_i^b = \frac{1}{\alpha^{a+b}} \sum_{i=1}^{n} P_i s_i^a (\alpha - s_i)^b \quad (16)$$

$$\sum_{i=1}^{n} P_i t_i^1 u_i^2 = \frac{1}{\alpha^{1+2}} \sum_{i=1}^{n} P_i s_i^1 (\alpha - s_i)^2$$

$$= \frac{1}{\alpha^3} \sum_{i=1}^{n} \left[ 1 P_i \alpha^2 s_i^1 - 2 P_i \alpha^1 s_i^2 + 1 P_i \alpha^0 s_i^3 \right] \quad (17)$$

$$= 1 \sum_{i=1}^{n} P_i \left(\frac{s_i}{\alpha}\right)^1 - 2 \sum_{i=1}^{n} P_i \left(\frac{s_i}{\alpha}\right)^2 + 1 \sum_{i=1}^{n} P_i \left(\frac{s_i}{\alpha}\right)^3$$

$$r_a = \sum_{i=1}^{n} P_i \left(\frac{s_i}{\alpha}\right)^a \quad (18)$$

$$\sum_{i=1}^{n} P_i t_i^1 u_i^2 = 1 r_1 - 2 r_2 + 1 r_3$$

$$\sum_{i=1}^{n} P_i t_i^2 u_i^1 = 1 r_2 - 1 r_3 \quad (19)$$

*Fig. 16*

$$\beta = s_{n+1} = \alpha + \|\mathbf{P}_{n+1} - \mathbf{P}_n\| \qquad (20)$$

$$\sum_{i=1}^{n+1}\left(\frac{s_i}{\beta}\right)^a = \sum_{i=1}^{n}\left(\frac{s_i}{\alpha}\cdot\frac{\alpha}{\beta}\right)^a + \left(\frac{s_{n+1}}{\beta}\right)^a$$

$$= \sum_{i=1}^{n}\left(\frac{s_i}{\alpha}\right)^a\left(\frac{\alpha}{\beta}\right)^a + \left(\frac{\beta}{\beta}\right)^a \qquad (21)$$

$$= \left(\frac{\alpha}{\beta}\right)^a \sum_{i=1}^{n}\left(\frac{s_i}{\alpha}\right)^a + 1$$

$$q_a' \leftarrow \left(\frac{\alpha}{\beta}\right)^a q_a + 1 \qquad (22)$$

↖ 415

$$\sum_{i=1}^{n+1}\mathbf{P}_i\left(\frac{s_i}{\beta}\right)^a = \sum_{i=1}^{n}\mathbf{P}_i\left(\frac{s_i}{\alpha}\cdot\frac{\alpha}{\beta}\right)^a + \mathbf{P}_{n+1}\left(\frac{s_{n+1}}{\beta}\right)^a$$

$$= \sum_{i=1}^{n}\mathbf{P}_i\left(\frac{s_i}{\alpha}\right)^a\left(\frac{\alpha}{\beta}\right)^a + \mathbf{P}_{n+1}\left(\frac{\beta}{\beta}\right)^a \qquad (23)$$

$$= \left(\frac{\alpha}{\beta}\right)^a \sum_{i=1}^{n}\mathbf{P}_i\left(\frac{s_i}{\alpha}\right)^a + \mathbf{P}_{n+1}$$

$$\mathbf{r}_a' \leftarrow \left(\frac{\alpha}{\beta}\right)^a \mathbf{r}_a + \mathbf{P}_{n+1} \qquad (24)$$

$$\sum_{i=1}^{n+1} t_i^1 u_i^5 = 1q_1' - 5q_2' + 10q_3' - 10q_4' + 5q_5' - 1q_6'$$

$$\sum_{i=1}^{n+1} t_i^2 u_i^4 = 1q_2' - 4q_3' + 6q_4' - 4q_5' + 1q_6'$$

$$\sum_{i=1}^{n+1} t_i^3 u_i^3 = 1q_3' - 3q_4' + 3q_5' - 1q_6'$$

$$\sum_{i=1}^{n+1} t_i^4 u_i^2 = 1q_4' - 2q_5' + 1q_6' \qquad (25)$$

$$\sum_{i=1}^{n+1} t_i^5 u_i^1 = 1q_5' - 1q_6'$$

$$\sum_{i=1}^{n+1} P_i t_i^1 u_i^2 = 1r_1' - 2r_2' + 1r_3'$$

$$\sum_{i=1}^{n+1} P_i t_i^2 u_i^1 = 1r_2' - 1r_3'$$

*Fig. 18*

$$ArcLength = \int_0^1 \sqrt{\left(\mathbf{Bez}_x'(t)\right)^2 + \left(\mathbf{Bez}_y'(t)\right)^2}\, dt \qquad (26)$$

$$q_a = \sum_{i=1}^{n} t_i^a \quad (27)$$

$$q_a = \sum_{i=1}^{n} t^a \rightarrow Q_a = \int_0^1 t^a dt \quad (28)$$

$$Q_1 = \int_0^1 t^1 dt = \frac{1}{2} t^2 \Big|_0^1 = \frac{1}{2} \quad (29)$$

$$Q_2 = \int_0^1 t^2 dt = \frac{1}{3} t^3 \Big|_0^1 = \frac{1}{3} \quad (30)$$

$$Q_3 = \int_0^1 t^3 dt = \frac{1}{4} t^4 \Big|_0^1 = \frac{1}{4} \quad (31)$$

$$Q_4 = \int_0^1 t^4 dt = \frac{1}{5} t^5 \Big|_0^1 = \frac{1}{5} \quad (32)$$

$$Q_5 = \int_0^1 t^5 dt = \frac{1}{6} t^6 \Big|_0^1 = \frac{1}{6} \quad (33)$$

$$Q_6 = \int_0^1 t^6 dt = \frac{1}{7} t^7 \Big|_0^1 = \frac{1}{7} \quad (34)$$

$$\mathbf{r}_a = \sum_{i=1}^{n} \mathbf{P}_i t_i^a \qquad (35)$$

$$\mathbf{r}_a = \sum_{i=1}^{n} \mathbf{P}_i t_i^a \rightarrow \mathbf{R}_a = \int_0^1 \mathbf{Bez}(t) t^a \, dt \qquad (36)$$

Fig. 21

$$R_1 = \int_0^1 \text{Bez}(t)t^1 dt$$

$$= \int_0^1 t^1 u^3 A_0 + 3t^2 u^2 C_0 + 3t^3 u^1 C_1 + t^4 A_1 dt$$

$$= \int_0^1 t^1(1-t)^3 A_0 + 3t^2(1-t)^2 C_0 + 3t^3(1-t)^1 C_1 + t^4 A_1 dt$$

$$= \frac{1}{20}A_0 + \frac{1}{10}C_0 + \frac{3}{20}C_1 + \frac{1}{5}A_1$$

(37)

$$R_2 = \int_0^1 \text{Bez}(t)t^2 dt$$

$$= \int_0^1 t^2 u^3 A_0 + 3t^3 u^2 C_0 + 3t^4 u^1 C_1 + t^5 A_1 dt$$

$$= \int_0^1 t^2(1-t)^3 A_0 + 3t^3(1-t)^2 C_0 + 3t^4(1-t)^1 C_1 + t^5 A_1 dt$$

$$= \frac{1}{60}A_0 + \frac{1}{20}C_0 + \frac{1}{10}C_1 + \frac{1}{6}A_1$$

(38)

$$R_3 = \int_0^1 \text{Bez}(t)t^3 dt$$

$$= \int_0^1 t^3 u^3 A_0 + 3t^4 u^2 C_0 + 3t^5 u^1 C_1 + t^6 A_1 dt$$

$$= \int_0^1 t^3(1-t)^3 A_0 + 3t^4(1-t)^2 C_0 + 3t^5(1-t)^1 C_1 + t^6 A_1 dt$$

$$= \frac{1}{140}A_0 + \frac{1}{35}C_0 + \frac{1}{14}C_1 + \frac{1}{7}A_1$$

$$C_0 = A_0 + r \cdot TV_r \quad (40)$$

$$C_1 = A_1 + s \cdot TV_s \quad (41)$$

$$Bez(t) = u^3 A_0 + 3tu^2(A_0 + r \cdot TV_r) + 3t^2 u(A_1 + s \cdot TV_s) + t^3 A_1 \quad (42)$$

$$TotSqErr = \sum_{i=1}^{n} \| Bez(t_i) - P_i \|^2$$

$$= \sum_{i=1}^{n} (u_i^3 A_{0_x} + 3t_i u_i^2 (A_{0_x} + r \cdot TV_{r_x}) + 3t_i^2 u_i (A_{1_x} + s \cdot TV_{s_x}) + t_i^3 A_{1_x} - P_{i_x})^2$$

$$+ \sum_{i=1}^{n} (u_i^3 A_{0_y} + 3t_i u_i^2 (A_{0_y} + r \cdot TV_{r_y}) + 3t_i^2 u_i (A_{1_y} + s \cdot TV_{s_y}) + t_i^3 A_{1_y} - P_{i_y})^2 \quad (43)$$

$$\frac{\partial TotSqErr}{\partial r} = 0 \rightarrow$$

$$3 \sum_{i=1}^{n} t_i^2 u_i^4 (TV_{r_x}^2 + TV_{r_y}^2) r + 3 \sum_{i=1}^{n} t_i^3 u_i^3 (TV_{r_x} TV_{s_x} + TV_{r_y} TV_{s_y}) s =$$

$$= TV_{r_x} \left[ \sum_{i=1}^{n} P_{i_x} t_i u_i^2 - (\sum_{i=1}^{n} t_i^1 u_i^5 + 3 \sum_{i=1}^{n} t_i^2 u_i^4) A_{0_x} - (\sum_{i=1}^{n} t_i^4 u_i^2 + 3 \sum_{i=1}^{n} t_i^3 u_i^3) A_{1_x} \right]$$

$$+ TV_{r_y} \left[ \sum_{i=1}^{n} P_{i_y} t_i u_i^2 - (\sum_{i=1}^{n} t_i^1 u_i^5 + 3 \sum_{i=1}^{n} t_i^2 u_i^4) A_{0_y} - (\sum_{i=1}^{n} t_i^4 u_i^2 + 3 \sum_{i=1}^{n} t_i^3 u_i^3) A_{1_y} \right] \quad (44)$$

*Fig. 25*

$$\frac{\partial TotSqErr}{\partial s} = 0 \rightarrow$$

$$3\sum_{i=1}^{n} t_i^3 u_i^3 (TV_{r_x} TV_{s_x} + TV_{r_y} TV_{s_y})r + 3\sum_{i=1}^{n} t_i^4 u_i^2 (TV_{s_x}^2 + TV_{s_y}^2)s =$$

$$= TV_{s_x}\left[\sum_{i=1}^{n} P_{i_x} t_i^2 u_i^1 - (\sum_{i=1}^{n} t_i^2 u_i^4 + 3\sum_{i=1}^{n} t_i^3 u_i^3)A_{0_x} - (\sum_{i=1}^{n} t_i^5 u_i^1 + 3\sum_{i=1}^{n} t_i^4 u_i^2)A_{1_x}\right]$$

$$+ TV_{s_y}\left[\sum_{i=1}^{n} P_{i_y} t_i^2 u_i^1 - (\sum_{i=1}^{n} t_i^2 u_i^4 + 3\sum_{i=1}^{n} t_i^3 u_i^3)A_{0_y} - (\sum_{i=1}^{n} t_i^5 u_i^1 + 3\sum_{i=1}^{n} t_i^4 u_i^2)A_{1_y}\right]$$

(45)

$$\begin{bmatrix} 3(TV_{r_x}^2 + TV_{r_y}^2)\sum_{i=1}^{n} t_i^2 u_i^4 & 3(TV_{r_x}TV_{s_x} + TV_{r_y}TV_{s_y})\sum_{i=1}^{n} t_i^3 u_i^3 \\ 3(TV_{r_x}TV_{s_x} + TV_{r_y}TV_{s_y})\sum_{i=1}^{n} t_i^3 u_i^3 & 3(TV_{s_x}^2 + TV_{s_y}^2)\sum_{i=1}^{n} t_i^4 u_i^2 \end{bmatrix} \cdot \begin{bmatrix} r \\ s \end{bmatrix} =$$

$$= \begin{bmatrix} \left(TV_{r_x}\left[\sum_{i=1}^{n} P_{i_x} t_i^1 u_i^2 - (\sum_{i=1}^{n} t_i^1 u_i^5 + 3\sum_{i=1}^{n} t_i^2 u_i^4)A_{0_x} - (\sum_{i=1}^{n} t_i^4 u_i^2 + 3\sum_{i=1}^{n} t_i^3 u_i^3)A_{1_x}\right]\right) \\ + TV_{r_y}\left[\sum_{i=1}^{n} P_{i_y} t_i^1 u_i^2 - (\sum_{i=1}^{n} t_i^1 u_i^5 + 3\sum_{i=1}^{n} t_i^2 u_i^4)A_{0_y} - (\sum_{i=1}^{n} t_i^4 u_i^2 + 3\sum_{i=1}^{n} t_i^3 u_i^3)A_{1_y}\right] \\ \left(TV_{s_x}\left[\sum_{i=1}^{n} P_{i_x} t_i^2 u_i^1 - (\sum_{i=1}^{n} t_i^2 u_i^4 + 3\sum_{i=1}^{n} t_i^3 u_i^3)A_{0_x} - (\sum_{i=1}^{n} t_i^5 u_i^1 + 3\sum_{i=1}^{n} t_i^4 u_i^2)A_{1_x}\right]\right) \\ + TV_{s_y}\left[\sum_{i=1}^{n} P_{i_y} t_i^2 u_i^1 - (\sum_{i=1}^{n} t_i^2 u_i^4 + 3\sum_{i=1}^{n} t_i^3 u_i^3)A_{0_y} - (\sum_{i=1}^{n} t_i^5 u_i^1 + 3\sum_{i=1}^{n} t_i^4 u_i^2)A_{1_y}\right] \end{bmatrix}$$

DIRECT INTERACTIVE, CONSTANT-TIME CURVE APPARATUS AND METHOD

BACKGROUND

1. The Field of the Invention

This invention relates to apparatus for drawing curves and, more particularly, to novel systems and methods for generating path-defined curves in real time on an output device in response to an input device controlled by a user receiving feedback from the output device.

2. The Background Art

Many computers are used by artists, draftspersons, engineers, architects, and the like for drawing figures related to their professional services. Representing structures in graphical images on paper or other display media may be accomplished in several ways. Traditional pencil on paper is still used. Ink on paper, linen, or plastic (e.g. MYLAR™) is used likewise. However, alterations of figures drawn with those media are difficult or impossible. Drawing curves with a digital computer has enabled many professionals to save, reproduce, scale, and modify graphic works more easily.

However, drawing curves, whether "curved lines" or curved surfaces, involves many tradeoffs. For example, a curve may actually be a visual representation of a very complex mathematical expression. The expression may be known or unknown. A curve may simply be part of an artist's representation of an object on a page or a display.

Using a computer to draw, save, and modify a curve is not so simple as drawing a brush or pencil in a smoothly flowing arc across a sketch pad. A computer requires discrete information with which to operate. A computer has limited processing capability and speed of computation. A user cannot always obtain actual calculated values of points on such a curve in real time (i.e. as that term is understood in the art; also, as a curve is drawn or defined by the user).

An artist or draftsperson using a computer stylus to draw a curve needs to control the curve drawn. Each user can benefit from seeing the curve develop, as it is drawn. A user needs to be able to adjust the motion of the hand according to the results of the rendering in order to create what is mentally envisioned. A user may also expect the computer to filter out erroneous jitter. Jitter may be attributable to an unsteady or misplaced hand, digital quantization, or other physical characteristic of a system, for example.

A user may operate without knowledge of the mathematics that would define a curve. For example, a user may not even care that a curve is being drawn according to a particular rule. Rather the user wants to display a representation on an output device, and wants to be able to sketch and modify the curve intuitively, by altering what is seen directly.

However, a mathematical formula or representation used by a computer to generate a curve might not use variables understandable or intuitive to a user. For example, many people could sketch a curve without the least idea how that curve is represented mathematically inside a computer. Relatively few users actually know how a smoothly undulating curve is represented as an exact function, spline function, piecewise-fit polynomial, Bézier curve, B-spline, logarithmic curve, infinite series, or the like.

For example, many persons can sketch a parabola without ever knowing the location of the point and line that actually define the parabola. Meanwhile, neither the point nor the line are on the parabola. To define a parabola rigorously according to its mathematical definition may be well beyond the skill, interest, or time investment available to many users.

A user may need to define an arbitrary curve. For example, a user may not want a particular, known curve, easily defined by a common formula, such as a circle, ellipse, or parabola. A user may need flexibility to represent exactly what is mentally envisioned. A user may want a curve that is far more sophisticated than a simple circular arc, or segment of an ellipse. A user may want an irregular, yet smoothly undulating, curve to ramble across a page.

The process of creating, defining and rendering an arbitrary curve is not well supported by current computerized drawing hardware and software. Interactive, path-defined curves simply do not exist. A good example of this difficulty is Bézier curves used in many software programs for drawing.

Bézier curves are supported by many commercial drawing software applications, alternatively referred to as "software," "applications," "programs," or "packages." Within each package, a variety of features (called tools) exist, each directed to accomplishing a single function such as marking a portion of an image, erasing lines, moving objects or points, drawing a straight line, a rectangle, a circle, a curve, and so forth. Many users of such packages find the drawing tools for Bézier curves difficult to use. A major difficulty arises because the user interfaces are either indirect or non-interactive.

The word "direct" indicates that a curve passes through or closely (i.e. a least squares best fit) approximates, the locations through which a cursor is guided by a user. The word "interactive" indicates that a user receives feedback in real time while defining a curve. The expression "real time" may mean exactly the same principle as ordinarily used in the art. It may also be thought of as indicating that any time delay between input and feedback is so short as to appear to a user to be visibly indistinguishable from instantaneous. In general, such delay in feedback may be sensorially imperceptible for some practical purpose. For example, a user may need a curve to be unrendered on a display monitor and re-rendered as the user moves a cursor corresponding to an endpoint of the curve.

A Bézier may be used as a parametric curve type in drawing software packages offering a very flexible extension to the set of elliptical and circular curves typically provided. Compared to the more general B-spline, the Bézier requires more direct, and relatively simplified controls.

Drawing typically involves creation of a curve, with subsequent editing. The Bézier curve creation and editing tools available in most commercially available software packages reflect the workings of the mathematical formulas underlying the definition of a curve. The user interface is not intuitive. Curve tools were originally developed for use by technically trained users such as engineers and scientists.

Users now include graphic artists, business professionals, and average personal computer users desiring to express pictorial information. The conceptual model or mathematical implementation inherent in a software package greatly hinders a user in illustrating a curve as an image on an output device.

For example, illustrating with a Bézier curve shape requires a counter-intuitive placement of control points $C_0$, and $C_1$ between two endpoints $A_0$ and $A_1$ (collectively "control variables" for a Bezier). $C_0$ and $C_1$ are not typically on the curve. They are off the curve and relate to the curve only in a mathematical relationship that is abstract to one not trained in the underlying mathematics.

Because existing tools for creation of Bézier curves are difficult to use, shapes generated with the aid of computer systems often require extensive modification. Thus, the very difficulty of use of available tools for Bézier creation directly results in subsequent heavy reliance on editing tools.

Unfortunately, existing Bézier curve editing tools tend to be even more difficult to use than the creation tools. An apparatus or method practiced in accordance with the invention may obviate much of the need for editing tools. Meanwhile, tools for both creation and editing may be greatly simplified by the invention.

Commercial implementations of Bézier creation tools perform tasks in one of two basic ways. The first way relies on an "interactive" curve tool, the second on a "freehand" or "direct" curve tool.

An interactive curve tool, on the one hand, updates a representation of a curve in real time as the user places control points. This tool is interactive because the user receives immediate feedback from an output device such as a display monitor. The feedback may be in the form of a rendered curve that changes with each movement of a cursor by a user. However, the conventional tools for Bézier creation, are also indirect because not all of the control points lie on the curve, as explained.

A freehand curve tool, by contrast, collects a sequence of cursor locations sampled while the user specifies a path for the desired curve. Such a tool is direct in that the resulting curve approximates or interpolates the sampled cursor locations. The tool is not interactive because the user does not see during creation the rendered representation of the curve. All the user sees during the specification of the path is either a set of dots representing the sampled locations, or a series of line segments connecting these locations. The resulting curve appears only after the specification of the path has been completed. The actual curve might not pass through any of the points specified.

Comparing the two tool types, "interactive" and "direct" or "freehand," demonstrates that each lacks the other's strength. The interactive curve tool is interactive but indirect. The freehand curve tool is direct but not interactive. Unfortunately, most users of commercial drawing software find the tools for drawing Bézier curves counter-intuitive, and too difficult to use effectively. Alternative tools are often even more clumsy and indirect. Meanwhile, numerous software systems have created innumerable files of existing or "legacy" artwork using largely Béziers, and certain other types of curves.

An apparatus and method are needed for sensing "directly" the motion of a sensor, (e.g. stylus, mouse moved by a user) rendering a representation of the motion by a curve sensible by a user. An apparatus and method are needed for "interactively" continuing or altering the curve in response to "direct" inputs from a user. More particularly, the direct and interactive creation and alteration of curves in a drawing are needed. Because Bézier curves are so ubiquitous, an apparatus for directly and interactively creating Bézier curves on an output device would be of tremendous value. Moreover, an apparatus would be substantially more valuable if the Bézier curve could be generated and altered in real time.

A method and apparatus for solving the aforementioned long-standing problems should accommodate all of the legacy artwork, so that users can still access and modify pre-existing work. A method is needed that is direct, intuitive, interactive, visually indistinguishable from instantaneous, and backwardly compatible with legacy artwork.

As mentioned, a "tool" may be thought of as a distinct feature or method for accomplishing a graphical function or drawing a shape, object, curve, or the like. Another existing problem is that different tools in the same or different drawing packages render curves using different rules, and thus use and store different parameters or variables. Therefore, confusion may arise when a user attempts to edit a curve of one type, using an interaction technique applicable to curves of a different type.

Unfortunately, in creation of a graphic work, several types of interaction techniques (tools) may have been used. However the resulting curves may be visually indistinguishable as to tool type. Without the proper choice of tool type, a curve cannot be edited. The result is frustration in trying to edit curves.

A method that would access any curve, regardless of its definition, and edit all curves simply, interactively, and directly would be a breakthrough. Moreover, a method that could edit a curve originally created by an interactive curve tool, a freehand tool, or any other given curve by a single method, transparent to the user, would be extremely useful. Such a single method could then be used to edit all curves created in legacy artwork regardless of origin, tool, rule, or definition.

Focusing somewhat more broadly, many other tasks unrelated to drawing and sketching may require smoothing, fitting, and representing a motion of a user. For example, operation of hydraulic equipment may be improved if its motion is controlled to be smooth and predictable rather than exactly tracking human inputs. In another example, a robot may be "taught" by tracking the motions of an expert human moving a sensor through a series of motions. For example, an expert painter may move a spray wand over the body of a car, relying on the human eye for feedback. Thereafter, a robot may move the spray wand over an equivalent path. Similarly, many other devices may use a stylus, lever, control stick, wand, motion sensor, or even a "DataGlove™" to track the movements dictated by a user.

Also, smoothing a ragged motion to create a smooth flowing motion may be beneficial. The processes are myriad that benefit from interactive devices, those providing feedback of the motion of a user's hand or other member. However, the human hand does not move perfectly smoothly, and no tracking system is perfect in sensing movements of the hand of a user, storing those movements, and operating on the resulting data to feed a picture, image, motion or other spatial representation back to a user. Smoothing the human director's inputs, such as by a curve-fit, removes jitter that may otherwise destroy effectiveness. For example, a gun or missile control on a combat vehicle or aircraft may rely on a human to track through and actuate a system of sensors and controls. A human hand is susceptible to being tossed about by vehicle motion or the like.

Tracking and reproducing a complex motion of a human user in real time (e.g. as soon as needed; practically or perceptibly instantaneously) as the motion is being made, may be difficult to impossible with typical desktop computers. Significant delay is typical for an individual computer user. Also, a user may over-correct because of the lag between actuation of a sensing device by a user and response by a machine. Thus, a user's interactive corrections may come too late, after the massive computations associated with tracking and rendering.

An apparatus is needed that can sense a motion of a user, approximate that motion with a repeatable, storable representation, such as a curve, present to the user a representation or rendering of the curve, and provide to a user an ability to continue or alter the curve interactively in real time (e.g. as needed; either feedback sensorially indistinguishable from instantaneous by the user, or feedback practically faster than the user's reaction time to begin inputting modifications).

These combinations of functions are not available in the art. Direct and interactive curve drawing in real time is not provided in computerized drawing packages available to average users. The broader tracking and rendering problem is not solved in packages provided for average users of personal desktop computers.

BRIEF SUMMARY AND OBJECTS OF THE INVENTION

In view of the foregoing, it is a primary object of the present invention to provide an apparatus for creating a curve directly.

It is another object of the invention to provide an apparatus for creating a curve interactively.

It is an object of the invention to provide an apparatus for creating a curve both directly and interactively at once and in real time.

It is an object of the invention to provide a method and apparatus for creating a path-defined curve interactively and directly in real time.

It is an object of the invention to provide a method and apparatus, for representing a curve, that require less time to edit, alter, or extend the curve than to create the curve.

It is an object of the invention to provide a method and apparatus for creating, for any original curve storable electronically, regardless of origin, a corresponding curve that is editable by the method and is visually indistinguishable from the original curve.

It is an object of the invention to provide a method and apparatus for editing all curves existing in legacy artwork, regardless of the tool, rules, or representative data by which the artwork was originally created.

It is an object of the invention to provide a method and apparatus for converting all curves to representations as Bézier curves, and for editing all curves existing in legacy artwork as Bézier curves, regardless of the tool, rules, or representative data by which the artwork was originally created.

It is another object of the invention to provide an apparatus for creating a curve from simplified parameters, variables substitutable for the mathematically defined "control variables" of the curve, to increase the speed of calculation and rendering of output reflecting changes in the curve.

It is another object of the invention to provide an apparatus for creating a curve from inputs sensed directly from motions of a user.

It is another object of the invention generally to provide an apparatus for sensing an input directly, processing the input to control an output device, and feeding back from the output device to a user a signal sensible to the user, enabling a user to adjust inputs interactively, and specifically to do so where the inputs correspond to a curve, and particularly to do so where the curve is a Bézier curve.

It is another object of the invention to provide from an output device to a user a signal sensible to the user and corresponding to variables transformed from control variables of a curve.

It is another object of the invention to provide an apparatus for sensing a movement by a user, providing an input corresponding to the movement, processing the input to create intermediate signals related thereto, to be passed to an output device, and feeding back from the output device to a user a signal sensible to the user and corresponding to the movement by a user, and more particularly to operate in real time.

It is another object of the invention to provide an apparatus for creating a curve using inputs sensed from movements of an input device moved by a user, processing the inputs to create intermediate parameters characterizing the curve, sending the intermediate parameters to an output device for generating signals corresponding to the movements and sensible by a user, all in real time, and specifically sufficiently rapidly to present smooth, fluid, animation to the eye of a user observing an output device.

Consistent with the foregoing objects, and in accordance with the invention as embodied and broadly described herein, an apparatus and method are disclosed in one embodiment of the present invention for creating curves. An interactive and direct curve tool may provide virtually immediate feedback to a user in real time. By real time is meant that an output signal is indistinguishable from instantaneous as to interactive fluidity of feedback from direct inputs by a user.

Feedback in real time may be received upon creation of a curve. A user may guide a stylus or other pointer (mouse, etc.) along a desired path. The tool may track such input device moved by a user. A cursor, on an output device, such as a display, monitor, CRT screen, or the like, may represent the motion of the pointer, as a user traverses a path with a pointer. An associated computer may sample locations of the cursor. A curve may be created, and rendered on the output device, which curve may pass exactly or approximately through the locations of points sampled. Thus the tool may be an interactive, direct, freehand tool operating in real time.

In many cases real time may mean that a feedback response from an output device is indistinguishable from instantaneous according to at least one desirable sensorial perception, such as vision, for example. However, in general, "interactive fluidity" is adequate to define real time. Interactive fluidity exists so long as a user may receive feedback from an output device (e.g. monitor, etc.) in response to moving a pointer (e.g. mouse, stylus, etc.), without being confused or feeling a need to stop inputting to wait for a rendering, by the output device, of the curve corresponding to the inputs. In one embodiment, an apparatus in accordance with the invention may render a curve in real time. The apparatus may comprise an input device for providing input signals corresponding directly to locations on a path specified by a user. The apparatus may also include a processor for receiving the input signals and providing output data corresponding to a curve fitted to the input signals. A memory device may store data received from the processor. An output device may provide, in real time, output signals sensible by a user and corresponding to the curve fitted to the input signals.

The processor may be a digital processor for operating on the data comprised of digital signals corresponding to a linearly transformable curve fitted to points corresponding to the locations specified. The input device may include a pointer adapted to be moved by a user on the path, the input device generating the input signals corresponding to the locations.

The output device may include an imaging device, and the imaging device may include a cursor for presenting to a user an image corresponding to a position of the pointer. The output device may include a rendering device for rendering an image of a curve corresponding to the input signals. The rendering device may also include a signal receiver for receiving output data from the processor for rendering a curve selected from cubic curves. The cubic curve may be a Bézier curve, a Hermite polynomial, a spline, a B-spline, or other curve. The rendering device may include a screen for rendering an image visible to a user.

The apparatus may include a processor programmed to directly receive input signals from a pointer moved by a user along the path, and interactively feed back through the output device in real time an image corresponding to a curve fitted to the locations specified by the user. The input device may be adapted to receive, in real time, additional input signals reflecting additional movement of the pointer by the user in response to the image. The output device may be adapted to render a second curve in real time reflecting the additional input signals.

The apparatus may rely on input signals comprised of digital signals representing discrete points. The input signals may correspond to points sampled at intervals along the path, or to a continuous curve.

An apparatus in accordance with the invention may feed back to a user a smoothed output signal in response to an input signal controlled directly by a user. An input device may be operable by a user to sense movements by a user and to selectively provide input signals corresponding to the movements. A processor connected to the input device may receive the input signals, logically operating on the input signals to provide process signals corresponding to a linearly transformable curve fitted to the input signals. A memory device may operably connect to the processor for storing input data corresponding to the input signals and for storing output data corresponding to the process signals. An output device may connect to the processor for receiving output data and for providing to a user output signals sensible by a user and corresponding to the output data.

An apparatus may be configured to interactively create a path-defined curve, using an input device to detect movements and to selectively provide input signals corresponding to the movements. A processor connected to the input device may receive the input signals and provide process signals corresponding to the input signals. A memory device operably connected to the processor may store the process signals corresponding to building variables. An output device connected to the processor may receive output data and provide to a user output signals corresponding to the output data.

A method practiced in accordance with the invention may incrementally augment, extend, or edit a path-defined curve in real time. The method may include moving a pointer associated with an input device. A user may input data corresponding to locations along a path. The user may specify inputs by controlling the pointer. The user may then create in a processor, connected to the input device, process data corresponding to a linearly transformable curve.

The method may then include operating on the process data to create building variable data representing a linear system of variables and coefficients corresponding to the linearly transformable curve. Operating on the building variable data to create output data corresponding to a curve fitted to the locations may then precede feeding back to a user on an output device connected to the processor an image of a curve corresponding to the fitted locations.

The method may include moving the pointer, in response to the image, and receiving added input data from the input device. The added input data may correspond to additional locations along a path. The method may then linearly transform the building variable data to create new building variable data for replacing the building variable data. The method may include feeding back to a user, in real time, on the output device, a new image for replacing the previous image.

The method may further repeat the receiving, linearly transforming, and feeding back according to inputs received from a user controlling the input device directing a continuation of the method. The interactive augmentation (updating) in real time according to direct new inputs from the input device, or otherwise input by a user, may continue so long as desired by a user. The augmentation may continue regardless of the number of new locations specified by the user.

An apparatus made in accordance with the disclosed invention, or a method practiced in accordance with the invention combines the strengths of each of the two tool types in a curve drawing tool that is much easier to use and more intuitive than tools heretofore available.

A Path-Defined Curve (PDC), generally, or Path-Defined Bézier (PDB), in particular, may rely on a least-squares fit of a polynomial. The polynomial, such as a cubic (third degree) Bézier curve, may be fit to a sequence of sampled locations. The locations may typically be identified by an input device, such as a pointer, controlled by a user. Manipulating a pointer, a user effects a change in a cursor's location on a screen of a monitor. Locations may be sampled over time to provide a set of points corresponding to points selected by the user with the pointer. The basic drawing apparatus and method may be extended with other input and output devices, beyond a pointer and monitor, respectively.

For example, an input device to provide points (values) in some number of dimensions may be selected from a wide variety of devices for providing signals. Signals may correspond to inputs sensed from movement or other activity. Similarly, an output device may feed back some representation of those values to a user. An output device may be selected from a wide variety of devices providing signals sensible by a user.

For example, outputs may be pressure against or from a location on a DataGlove™ worn by a user. Output may be a pressure distribution along a line or surface. Output may be a light intensity in a display or graphic image, or a black or white pixel on a monitor. Output may be a sound amplitude or frequency distribution in time or space, or the like. Thus, many perceptible signals may represent an output of a curve to a user. In some cases a device may be designed to receive an output signal, but a very useful example involves a human user perceiving an output corresponding to an input provided by the user.

An apparatus and method in accordance with the invention may rely on incrementally adjusting a least-squares fit of a curve. Conventional methods relying on a least-squares fit are limited to short curves in order to maintain acceptable time of computation. That is, least-squares fitting is computationally intensive. The processing time increases linearly with a number 'n' of sampled points used in the procedure. The curve must be recomputed and rendered anew with each added point input by a user. The total number of points directly affects how quickly a computer can recompute and render an updated representation of the curve created by a user. Delays from such methods can quickly preclude rendering outputs in real time.

By contrast, a curve rendered by a tool created according to the invention operates in constant time. That is, a constant update frequency may be used for rendering a curve. This may be true regardless of whether the curve is based on a few, a few hundred, or a few thousand sampled cursor locations.

A new data structure corresponds to a path-defined curve (PDC), and, in one particular example, to a path-defined Bézier (PDB). The data structure supports an incremental "augmentation" to a least-squares method of fitting a curve with each added input.

An apparatus and method in accordance with the invention may enable a user to interactively draw a curve, rendering the curve on an output device for feedback to a user in real time. For example, the user may see an animated intermediate result on a monitor while the curve is being drawn.

A multi-segment curve may be drawn and rendered by an apparatus in accordance with the invention. Multiple segments may be combined in a post-processing check for continuity or by constraining the ends of adjacent curves to insure continuity of the curves or their slopes (tangency). Such a constraint may be used in combination with a user interface that provides to a user ultimate control to assure that the resulting curve reflects the user's intent.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 12 is a series of equations illustrating a method for representing a curve in one embodiment of a method and apparatus according to the invention;

FIG. 13 is a series of equations illustrating a method for creating a linear system of coefficients and variables for defining a curve according to the invention;

FIG. 14 is a series of equations illustrating a method for defining and evaluating coefficients in the system of FIG. 13;

FIGS. 15 and 16 are series of equations illustrating a method for mapping the coefficients (summation terms) of the system of FIG. 13 to building variables q and r;

FIG. 17 is a series of equations illustrating a method for linearly transforming building variables q and r to new building variables q' and r';

FIG. 18 is a series of equations illustrating a method for updating coefficients of the system of FIG. 13 for representing a new curve to be rendered on an output device due to the additional inputs of a user in accordance with the invention;

FIG. 19 is an equation illustrating an exact mathematical expression representing an arclength of a continuous curve, in contrast to an approximation by chords between discrete points;

FIGS. 20–22 are series of equations illustrating a method for synthesizing building variables Q and R (to be used similarly to building variables q and r in the system illustrated in FIGS. 15–16) from data associated with a continuous curve input according to the invention;

FIGS. 25–26 are series of equations illustrating a method for representing an alternative embodiment of a linearly transformable curve representable by an alternative system of control variables and equations distinct from those of FIG. 13.

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 28, is not intended to limit the scope of the invention, as claimed, but it is merely representative of the presently preferred embodiments of the invention.

The presently preferred embodiments of the invention will be best understood by reference to the drawings, wherein like parts are designated by like numerals throughout.

Figure 1:
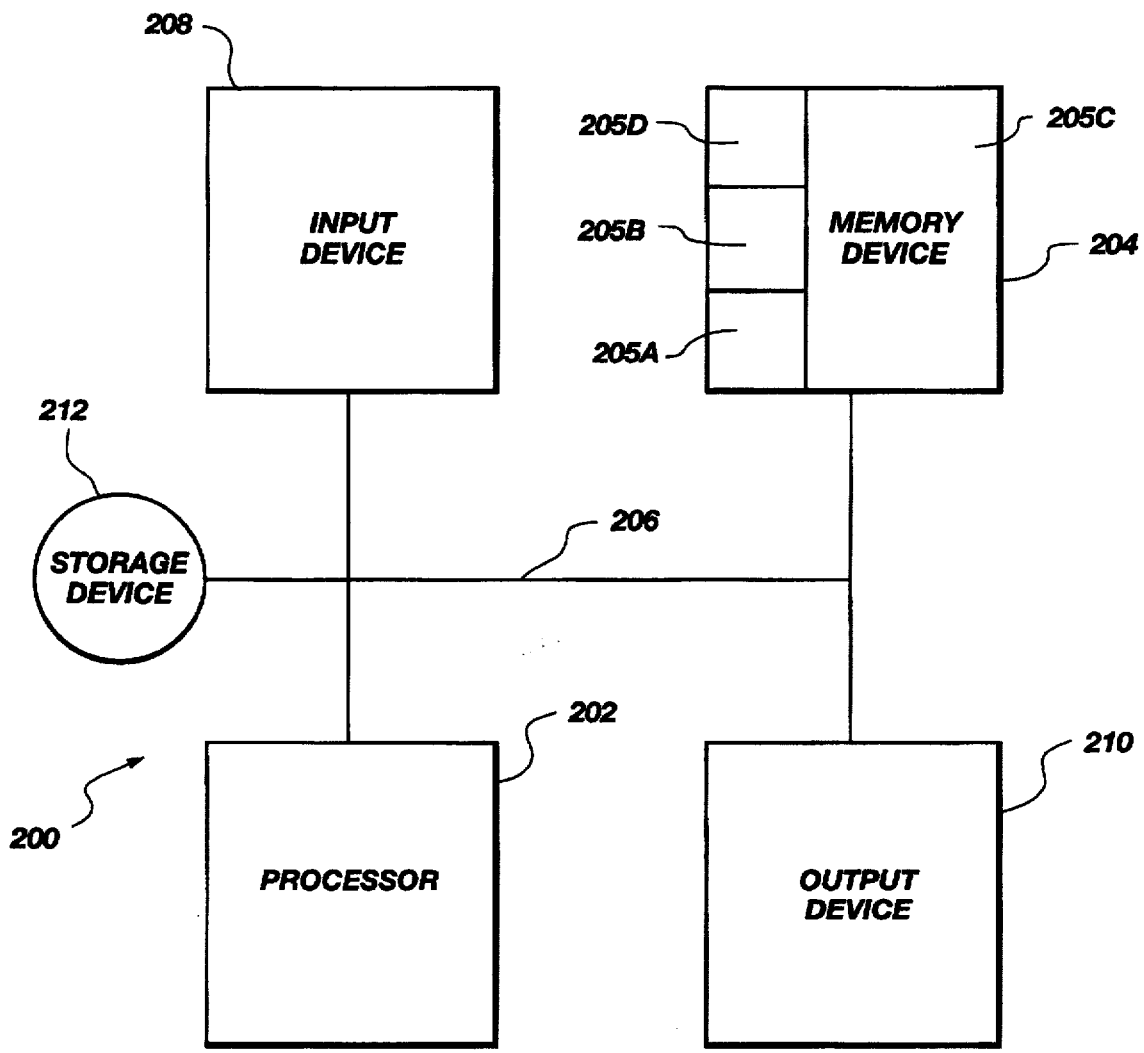
FIG. 1 is a block diagram of one embodiment of an apparatus for creating a curve according to the invention.
Figure 5:
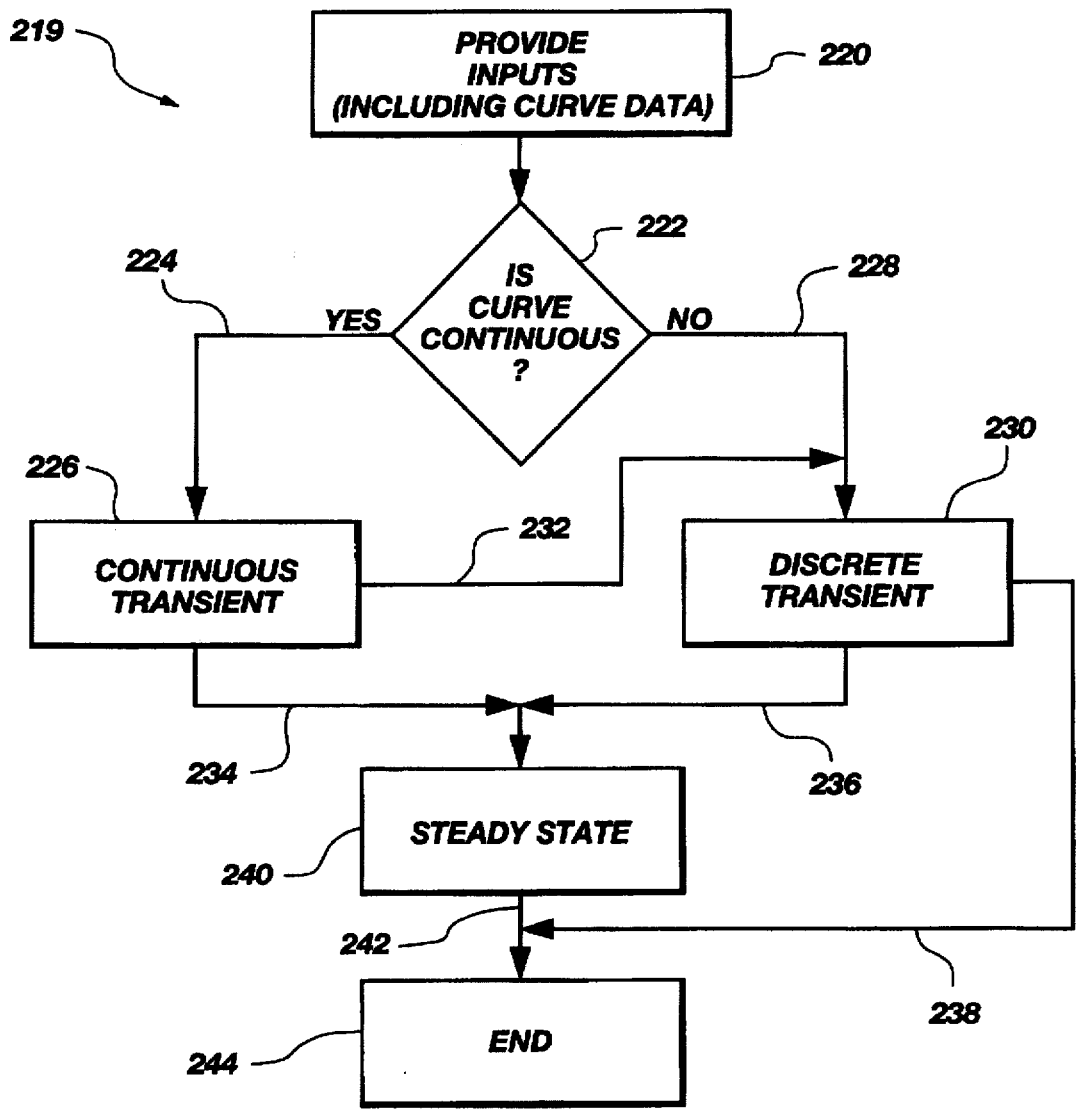
FIG. 5 is a block diagram of a generalized method in accordance with the invention.
Figure 7:
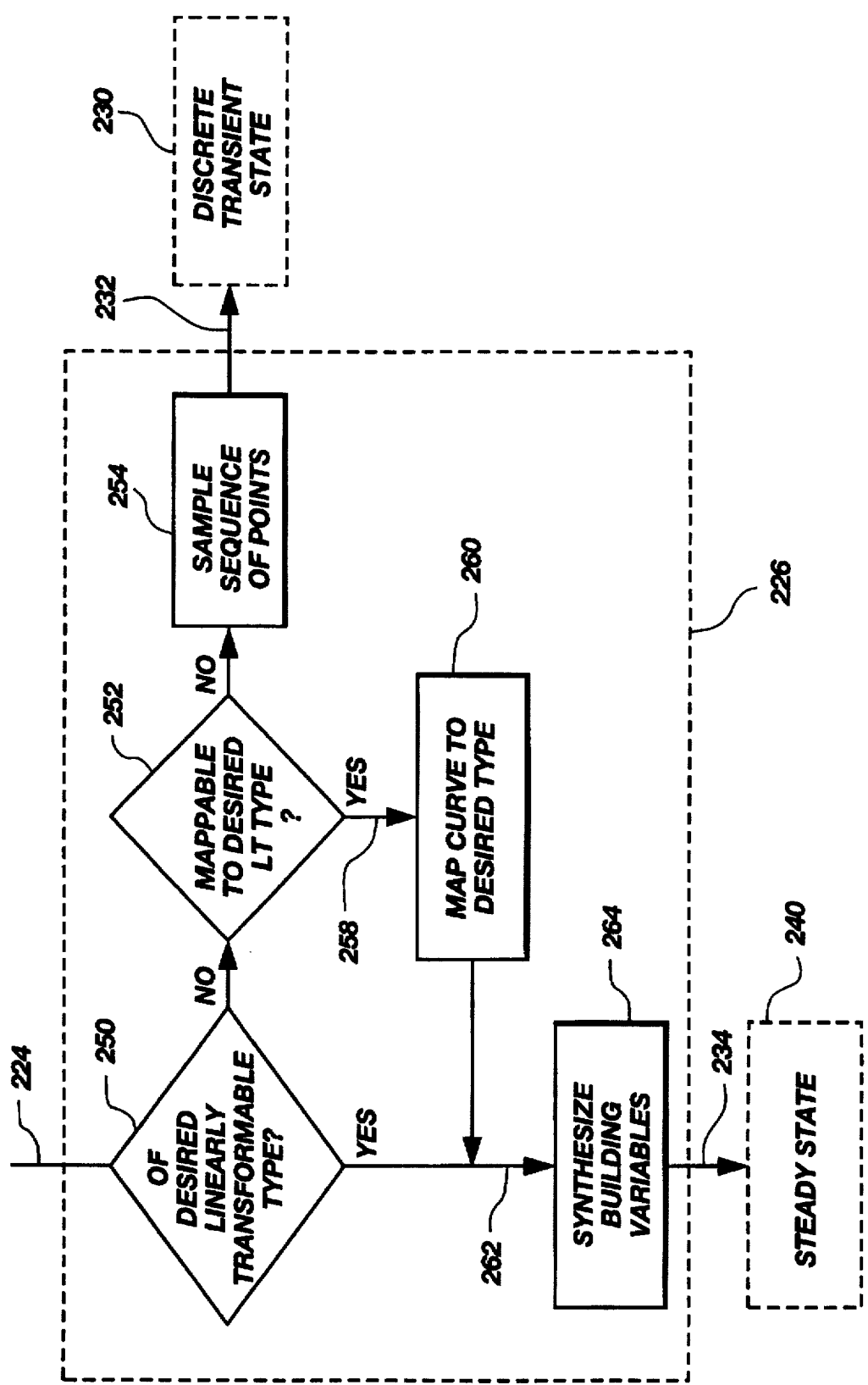

Reference is next made to FIGS. 1 and 5, which illustrate schematic diagrams of one preferred embodiment of an apparatus and method, respectively, in accordance with the invention. Also, FIGS. 6–11 illustrate schematic diagrams derived from the block diagram of FIG. 5. Those of ordinary skill in the art will, of course, appreciate that various modifications to the detailed schematic diagrams of FIGS. 6–11 may easily be made without departing from the essential characteristics of the invention, as described in connection with the block diagrams of FIGS. 1 and 5 above. Thus, the following description of the detailed schematic diagrams of FIGS. 6–11, and the representations of FIGS. 12–28 are intended only as an example, and simply illustrate certain presently preferred embodiments of a schematic diagram that is consistent with the foregoing description of FIGS. 1 and 5 and the invention as claimed herein. The various functional blocks of FIG. 5 are outlined in FIGS. 6–11 by the bold, dashed lines and are numbered with like numerals.

From the above discussion, it will be appreciated that the present invention provides direct and interactive creation and rendering of a path-defined curve from inputs generated by an input device controlled by a user, and outputs fed back to a user via an output device. The invention also provides for augmentation, editing, and extension of a curve, or image of a curve on an output device, in real time according to additional inputs by a user controlling the input device.

Referring now to FIG. 1, an apparatus 200 made and used in accordance with one preferred embodiment of the invention may include a processor 202 and memory device 204 interconnected by a bus 206 for transmitting signals, such as digital data therebetween. The bus 206 may be selected from one of those available on a motherboard of a general purpose digital computer, or may be unique to an apparatus made in accordance with the invention.

An input device 208 and output device 210 may also connect to the bus 206 to communicate with the processor 202. A storage device 212 may also be included on the bus 206 for permanent storage of data corresponding to signals and the like transmitted, received, or processed by the processor 202.

A processor 202 may be configured to process signals received from an input device 208, store data representing those signals, and provide output data to an output device 210. The processor 202 may create, receive and transmit instructions with respect to any device on the bus 206.

Suitable processors 202 may include those found in central processing units (CPU) of many popular, general-purpose, computers. Of particular interest and applicability are desktop computers, referred to as microcomputers or minicomputers, and having comparatively limited processing speed compared to mainframe computers. CPUs may be selected from such integrated chips as the Motorola 68000 series, including MC 68020, MC 68030, and MC 68040. Likewise, a suitable CPU may be selected from the Intel 80000 series, including the 80286, 80386, 80486 and Pentium CPUs. Also, RISC chips such as the Power PC 601, 602, 603, 604, and 620 may be completely suitable.

A memory device 204 may be configured to temporarily store instructions for the processor 202, data for being operated on in accordance with those instructions, and data representing intermediate calculations of values by the processor 202. The memory device may also store data representing inputs received from an input device 208 and output data to be sent to the output device 210.

Suitable memory devices 204 may include random access memory (RAM) of most commercially available types. Volatile memory that loses all data and signals upon losing power is typically suitable. Although less preferred, some nonvolatile memory devices 204 may be used, but may slow performance of the apparatus 200 in accepting inputs, processing signals, and providing outputs.

A memory device 204 may be configured to be partitioned or otherwise addressable to include a first memory 205A, a second memory 205B, and a general operating memory 205C. The memory device 204 may also include an event queue 205D for recording monitored events occurring in the apparatus 200. Monitored events may include any activity that may used by any of the various devices 202, 204, 206, 208, 210, 212 or to control them.

An input device 208 may be configured to generate signals to be processed by the processor 202. However, the input device 208 may also read data from another device inside or outside the apparatus 200. For example, an input device 208 may receive data from another computer for processing, may include a processor within itself, may include a sensor for sending analog or digital signals, or may otherwise be configured to provide data input by or under the control of a user.

An input device 208 may be selected from numerous devices including a freehand pad for detecting motion of a stylus against a sensory surface supported by a platen. Examples of these types of pads are those used on special purpose computers used for recording signatures of recipients of packages. Also, sketch pads that respond to a stylus moved over a surface may serve as input devices 208. A mouse, a motion detector for generating signals corresponding to a position in one, two, or more spatial dimensions while moving over a surface, may serve as an input device 208. Another input device 208 may be a DataGlove™, a device fitted with sensors for detecting motion or pressure by a finger, hand, or other member of the body of a user. Other input devices 208 may include hardware as simple as switches, as conventional as a joystick, trackball, or touchscreen display, or as sophisticated as an imaging camera of some variety. For example, a computed tomography scanner, a magnetic resonance imaging machine, or an ultrasonic imaging device may all provide inputs with varying amounts of human intervention. In certain circumstances, an input device 208 may be unknown, being represented only by a queue of data representing signals collected from a source and stored as digital electronic signals in the memory device 204 or the storage device 212.

An output device 210 may be configured to provide a signal to a user. The signal may be perceptible to the senses of a user. For example, sound, motion, pressure, an image, a light, an intensity or frequency of sound, an intensity or frequency of light or other signal from an electromagnetic spectrum may be output signals from the output device 210. An output device may include or otherwise be associated with devices for converting signals from one representation to another. In one presently preferred embodiment, an output signal from the processor 202 may be presented (rendered) as a curve on a screen of a computer monitor. In another, less preferred, embodiment, an output signal may be received, recognized, and responded to by an electromechanical device.

The output device 210 may be a monitor such as a cathode ray tube CRT, flat panel display or the like. Alternatively, some input devices 208 may include devices to serve as an output device 210. For example, a touchscreen display may render images and receive inputs from a user. Similarly a medical imaging device such as an ultrasonic or magnetic resonance imaging device, may have an output device readable only by the device itself, or perceptible to a user. An apparatus 200 in accordance with some embodiments of the invention may have outputs perceptible to a human user, outputs imperceptible to a human user, or both. However, in one preferred embodiment of great interest, the output of an output device 210 may be sensible (sensorially perceptible) by a user.

The storage device 212 may be present or not in the apparatus 200. The storage device 212 may be configured to receive data for long term storage between accesses by a user. For example, in one presently preferred embodiment, a storage device 212 may store a set of data for representing a curve 398 as part of a drawing. Alternatively, a storage device 212 may store a software package including the instructions executable by the processor 202, data representing curves to be operated on by a user controlling the processor, as well as instructions accessible by a processor 202 for controlling operation of all devices connected to the bus 206.

The storage device 212 may be selected from one of the many available types, and from a host of specific products in those types. Typical storage devices 212 may be selected from hard disk drives for storage of electronic data, flexible disk drives, electromagnetic tape drives, optical disk drives, PCMCIA memory, and the like. A suitable storage device may be non-volatile, so that data remains present in the absence of power. However, in some embodiments, RAM type of memory, although less preferred due to power and maintenance requirements, may be suitably configured to serve as a storage device 212.

Referring now to FIGS. 2–4 and 5–11, in one embodiment of an apparatus 200 and method according to the invention, the processor 202 may be programmed to operate according to the steps illustrated in FIG. 5. The steps of FIG. 5 are expanded in detail in FIGS. 6–11.

The apparatus 200 may receive inputs. When inputs are provided 220, they may be received (read, transmitted, etc.) from an input device 208, general memory 205C or from an event queue 205D. The inputs may be associated with a curve 398 (see e.g. FIG. 3). Inputs may include, for example, data corresponding to a curve 398 (fit to data or otherwise defined) or points 418 along a path 420 specified by a user. Inputs may also include instructions for controlling any or all devices 202, 204, 206, 208, 210, 212 associated with the bus 206.

Upon provision 220 of inputs, including receipt of data corresponding to a curve 398 or points 418, a test 222 may determine whether or not the curve 398 is continuous or discrete. That is, a curve 398 may be a continuous function for which values of a dependent variable exist in a domain for all values of an independent variable (parameter) over a range. If a curve 398 is continuous, then the apparatus 200 and method 219 may follow the path 224 to operate in a continuous transient state 226 to create a curve 400 representing the curve 398.

It may be that a curve 398 is of a desired type of linearly transformable curve. In that case, a representation of the curve 398 may include control variables 401. The control variables may comprise, for example, anchor points 402,408 and control points 404, 406 illustrated in FIG. 2. Control points 404, 406 are used to define the curve 400, and may also be used to define the curve 398. In such a case, the curve 398 is considered to be a desired linearly transformable curve 400.

By contrast, if only data associated with discrete points 418 or 426 are provided, then the method 219 and apparatus 200 may be directed via the path 228 to a discrete transient 230 operation for representing the curve 398 as the curve 400. That is, a curve 398 may be merely a series of discrete points 418 (FIG. 2) from a specified path 420, or points 426 provided as inputs representing a curve 398 to be fit with a curve 400.

Depending on the nature of a continuous curve 398 at the continuous transient step 226, the apparatus may follow the path 232. That is, the processor 202 may provide data corresponding to discrete sampled points 426 (see FIG. 3) from a continuous curve 398. The apparatus 200 may then operate according to the discrete transient step 230.

After completing either the continuous transient step 226, or the discrete transient step 230, the apparatus may follow the respective paths 234, 236 to operate according to a steady state 240 representation of the curve 398 as the curve 400. In the event that only data corresponding to an insufficient number of discrete points 418 are provided, the apparatus may follow the path 238 and end 244 processing of input and output data.

In each of the steps including the continuous transient 226, discrete transient 230, and steady state 240, the processor 202 retrieves input signals, for example, data, from the input device 208 directly or from the memory device 204. The processor 202 may process those inputs to create rendering data, signals to be sent to the output device 210 for controlling creation of an image or other output signal sensible by a user.

The distinctive operation of the processor 202 in the continuous transient 226 mode processes input data to create a representation of a continuous curve 398. The operation of the processor 202 in the discrete transient 230 mode manipulates inputs to create a curve 400 fitting the points 418 from input data. The processor 202 in the steady state 240 mode augments (edits, extends, changes) a curve 400 that has been cast in a linearly transformable representation.

Thus, the curve 400 resulting from the discrete transient step 230 or from the continuous transient step 226 can be linearly transformed. Linear transformation relies on the fact that a curve 400, typically represented by a series of summations of terms involving powers (nonlinear terms) of a dependent variable, can be mapped to a simple linear algebraic sum of terms called building variables 414. (See e.g. FIGS. 15 and 16, particularly Equations 14 and 18.)

Linear transformation indicates that a curve represented by an algebraic sum of building variables 414 can be transformed by simple multiplication and addition for each term, to create a new solution for a new curve without having to go back to the nonlinear terms nor the mapping of those nonlinear terms to linear. algebraic equations of building variables 414.

The curve 400 is represented by terms that can be scaled algebraically as illustrated in FIG. 17, Equations 20, 22, 24 to be updated quickly, in real time in response to direct inputs by a user. The terms of the original representation of the curve 400 are transformed to create a new curve, rather than re-calculating or regenerating a new curve 400 in its entirety from summations or other series of non-linear terms. Thus, a curve 400 may be cast in terms facilitating extension (editing, augmentation, change) of the curve 400 in real time in response to the addition of inputs representing new points to be included in the curve 400.

Thus, with a linearly transformable curve 400, the processor 202 may read inputs designating directly points 418 to be included in the calculation of the curve 400. The processor 202 may then process the inputs to provide rendering data, and instructions to the output device to provide feedback, such as an image presented to a user on an output device 210. The feedback (e.g. image on a monitor) enables additional inputs for correction, augmentation, editing or the like for adjusting the output provided as feedback.

For example, a user may move a pointer associated with the input device 208, seeking to change an end point from 430 to 432 of a curve 400 presented on a screen of a monitor associated with an output device 210. The processor 202 processes that input data associated with the motion of the pointer, and provides rendering data for controlling the output device 210. The output device 210 presents (renders) a new visual image representing the edited curve 400 on the visible screen of the output device 210. By the method of the invention, the entire process (226, 230, 240) of inputting, creating, and rendering a curve 400 may occur in real time as a user manipulates the input device 208 along the desired path 420 specifying the curve 400.

Referring now to FIG. 5, the method 219 implemented in an apparatus 200 of the invention may provide 220 inputs representing, among other things, data representing a curve 398. The signal serving to input the curve 398 may be represented digitally by a continuous function, or discrete points 426 (see e.g. FIGS. 2 and 3).

A negative result from the test 222 for a continuous curve 398 from the inputs provided 220, may direct the process 219 or method 219 to a discrete transient state 230 (see path 228). The discrete transient state 230 then may operate as though points 426, inputs representative of the curve 398, are simply inputs to be fit with a curve 400.

If the curve 398 is continuous, a positive result from the test 222 is indicated by the path 224 where a continuous transient 226 operation or step creates a curve 400 representing the input curve 398. A test 250 first establishes whether the continuous curve 398 is of a desired linearly transformable type. For example, if the method 219 of a tool relies on cubic Bézier curves, the curve 398 may be required to be a cubic Bézier curve. Similarly, a Hermite cubic, or some other curve may be desired in order to operate according to programmed rules of the apparatus 200 or method 219.

If the curve 398 is not of a desired linearly transformable type, a test 252 determines whether the curve 398 may be mappable to a desired linearly transformable type. That is, mapping one type of curve onto another is done in a large variety of well established ways too detailed to recite here. Some mapping methods simply require substitutions of terms in equations. If the curve 398 is not mappable to a desired linearly transformable type, then the method samples 254, such as by calculating several points 426 on the curve 398. With these discrete points provided, the method may proceed via path 256 to the discrete transient state 230. If instead the curve 398 is mappable to a desired linearly transformable type, then the mapping 260 is done. Thus, the method may then return via the path 262 to synthesize 264 a set of building variables 414. To understand the synthesis process, one may refer to EXAMPLE I below. Attention is directed particularly to FIGS. 19-22, Equations 28 and 36.

To synthesize 264 the building variables 414, the curve 398 is represented as a least squares error fit. The least squares method results in a series of terms that are summations of powers. (See e.g. FIGS. 12-16, all equations in the order shown, and associated text. Compare with FIGS. 19-22 and associated text.) Instead of evaluating these summations, a definite integral is substituted for each summation. The integral may be integrated along the entire curve 398 as a definite integral.

Thus, the coefficients derived from summations as required by a linear system of equations (see e.g. FIG. 13, Equation 7) may be evaluated using algebraic sums of building variables 414 (see e.g. $q_a$ and $r_a$ in FIGS. 15, 16, Equations 15, 19, respectively). In turn, the integrals used in synthesis of building variables 414 create terms (see e.g. FIGS. 20, 21, Equations 28, 36) equivalent and substitutable into a linear system of equations (see e.g. FIG. 13, Equation 7). The linear system of equations may then define the control variables 401 by which the fitted, linearly transformable, curve 400 is properly described. (See generally, e.g., development of $Q_a$ and $R_a$ in FIGS. 20, 22, Equations 27-34, and 37-39, respectively.) Following synthesis 264 of the building variables 414, the method 219 proceeds via path 234 to the steady state 240 operation.

Figure 2:
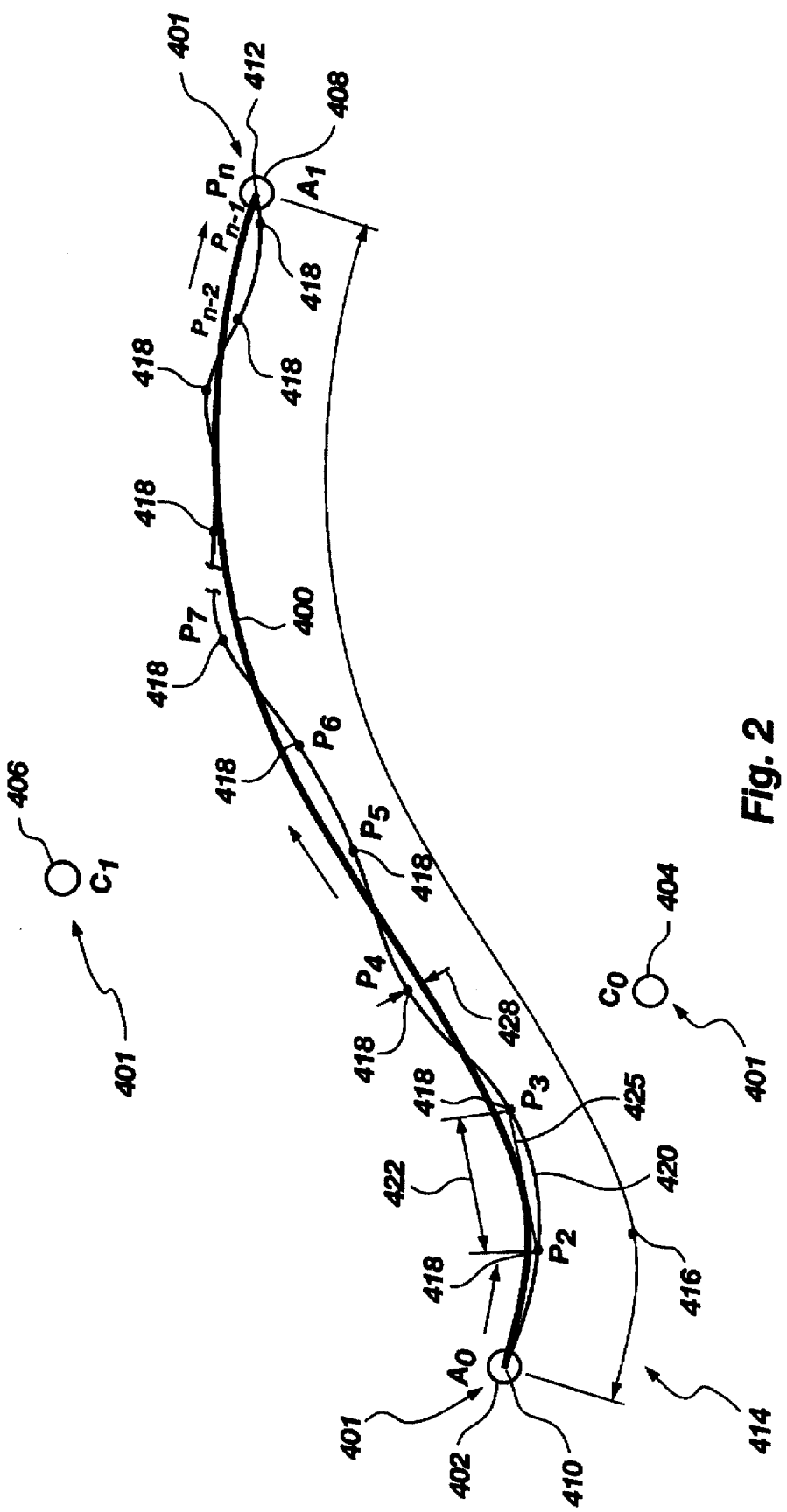
FIG. 2 is a schematic of an image of a curve fit to points on a path specified by a user.
Figure 8:
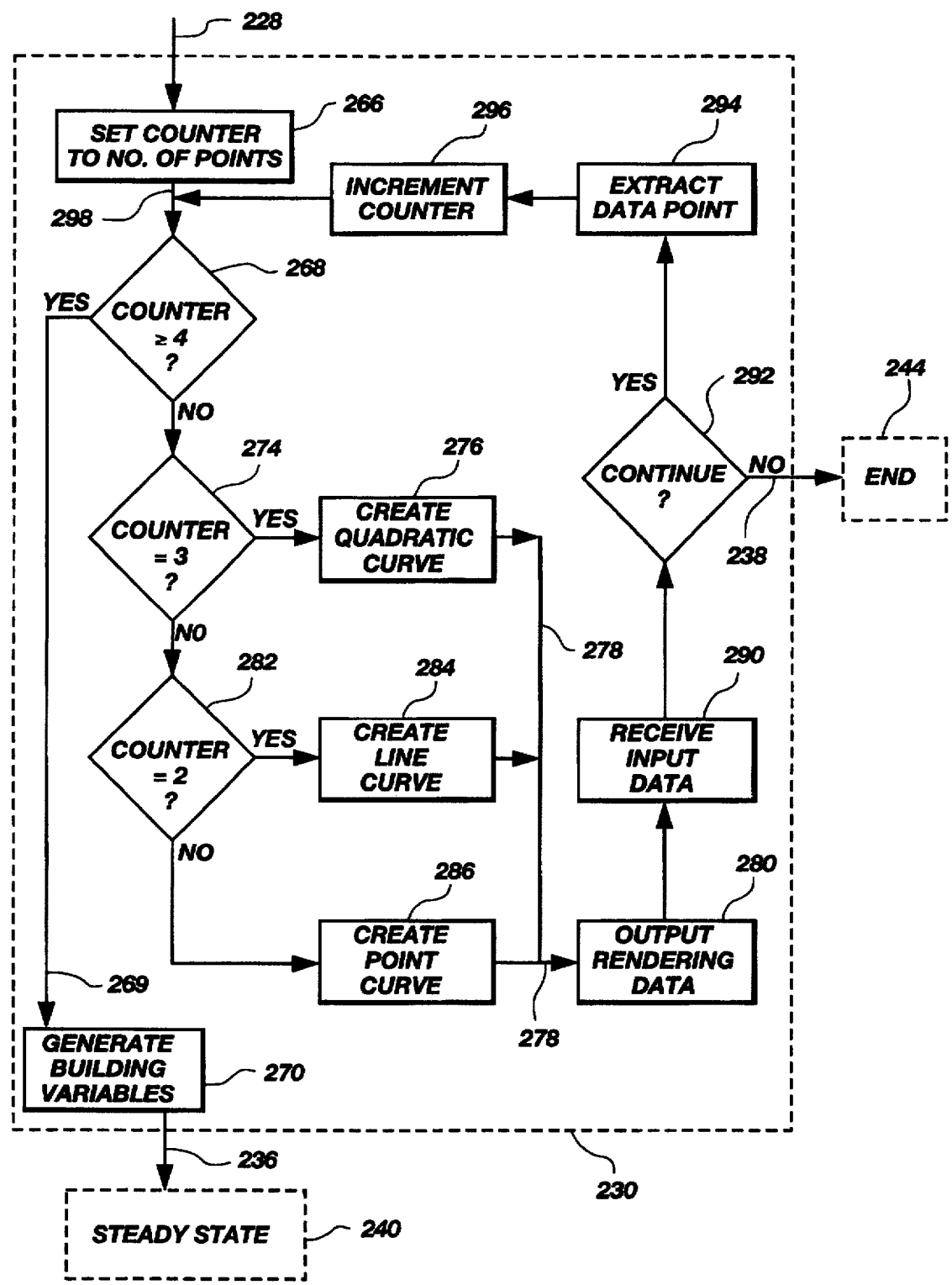

Referring now to FIG. 8, the discrete transient state 230 begins by setting 266 a counter to be equal to the number of discrete points 418 that must be fitted by a curve 400 (see e.g. FIG. 2). A test 268 evaluates the counter to determine if it is higher than the number of points required to fit a curve 400 of the desired degree. If the curve 400 is of degree 5, then 6 points are typically required, unless a degenerate case is to result. For a curve such as a Hermite cubic, cubic spline, or cubic Bézier, 4 points are needed. For a cubic curve 400, any number of points 418 less than 4 results in a degenerate representation of the curve 400. (See FIG. 8, steps 276, 284, 286, for example.)

If the number of points 418 provided is sufficient, a positive result 269 for the test 268, the method 219 may generate 270 the building variables 414 for the curve 400 to be augmented in real time. To generate 270 building variables 414, the method may map the coefficients (see, e.g., FIG. 13, Equation 7) of control variables 401 (see, e.g., FIG. 2 control points 404, 406 and anchor points 402, 408) for describing the curve 400 to a system of linear algebraic equations. (See e.g. FIGS. 15, 16 Equations 14, 15 and 18, 19.) After generating the building variables 414, the method 219 may proceed to the steady state 240 via the path 272.

If the counter is less than the required number of points 418, then the method 219 proceeds to create degenerate curves 400 until enough points 418 are added to create a curve 400 of desired degree. For example, the test 274, if positive, directs the processor 202 to create 276 a quadratic curve, and output 280 data for eventual rendering of the curve 400 on an output device 210. If the test 274 is negative, the next degenerate case is tested 282.

Similarly, if the counter is only two, indicating two points 418, then the test 282 directs the method 219 to create 284 a line, a degenerate first degree polynomial for the curve 400. A negative result from the test 282 directs the method 219 to the next degenerate case. Note that the number of degenerate cases may be three for a cubic fit for the curve 400, but may be different for another degree of polynomial.

Eventually, the default for negative results of all tests 268, 274, 282 directs the method 219 to create 286 a point curve 400. All degenerate curves are output 280, in turn, for rendering. The output 280 of rendering data by the processor 202 may be accomplished by passing data to the output device 210, the memory device 204, or the storage device 212. In one embodiment, the processor 202 may pass signals directly to the new memory 205A for reading and rendering by the output device 210.

Figure 9:
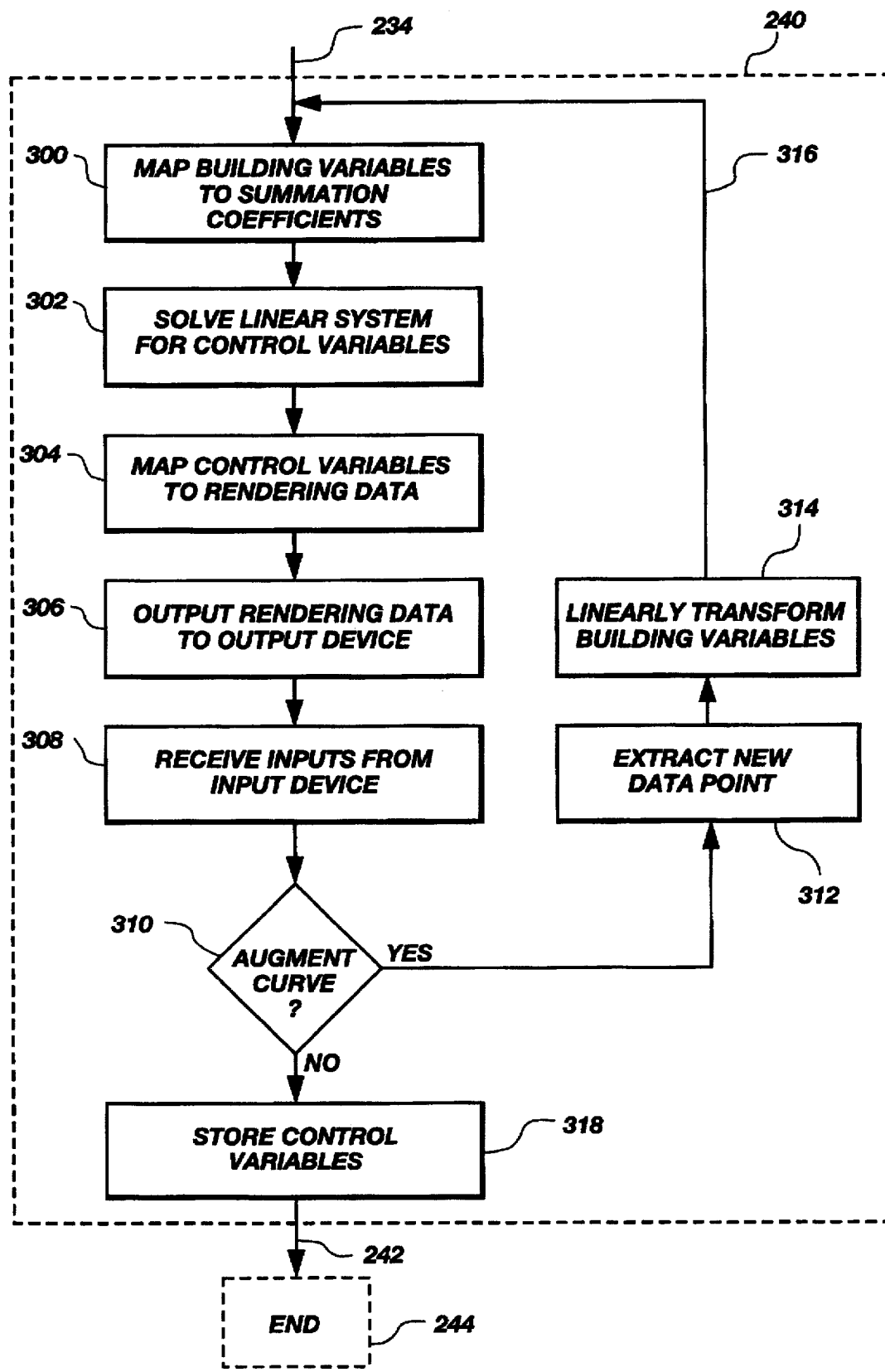

Referring now to FIG. 9, and also FIG. 5, the steady state 240 may be reached via the continuous transient 226 and path 234 or the discrete transient state 230 and path 236. The steady state 240 operation of the apparatus 200 may be centered in the processor 202. First the building variables 414 are mapped 300 to the summation coefficients of a linear system of equations. (See e.g. FIGS. 13, 15, 16, Equations 7, 15, 19, respectively.) Then, the linear system of equations is solved 302 by any suitable method. A system of equations may be permitted to be non-linear in some circumstances, but the linear transformation of the solution has been found to function by the example illustrated.

The control variables 401 are then mapped 304 to rendering data. Again, numerous methods may be used to convert a signal representing the control variables 401 defining a curve 400 into a signal for controlling rendering of the curve 400 on an output device 210. In digital data, the signals may be mapped by software codes well established for driving monitors to display graphical data.

The rendering data is next sent 306 to the output device 210. The output device 210 may be controlled by the processor 202 or may simply accept data from the processor 202 or memory device 204.

The apparatus 200, by means such as the processor 202, next receives 308 inputs from the input device 208. The inputs may include data corresponding to new points 418 (FIG. 2) or an augmenting point 432 (FIG. 4) for editing or extending a curve 400. The inputs may also include data corresponding to movements of a pointer associated with the input device 208. For example, a user may use a mouse or stylus to indicate not only a point 418 or 432, but the fact that the point 418, 432 is to be added to the curve 400.

The test 310 may evaluate whether the curve 400 is to be augmented, based on the inputs received 308. A positive result begins the iteration by extracting 312 data associated with a new data point 432 from inputs received 308. The new data is used to linearly transform 314 the building variables 414 without regenerating them from "scratch" as was done in the discrete transient state 230 and continuous transient 226.

One embodiment of linearly transforming 314 the building variables 414, for one presently preferred embodiment of the invention, is illustrated in FIGS. 17 and 18. In general, linear transformation 314 may be accomplished in numerous ways. A characteristic of the linear transformation is that the building variables 414 need not be regenerated from data corresponding to the points 418 or curve 400. Also, each building variable 414 may be updated directly, without resorting to any of the constituent terms from which it was created. Instead, all the building variables 414 may be updated by simple ratios, products, additions, or all the foregoing as, for example, in FIG. 17, Equations 22 and 24. In the example, the arc length 416, designated α, is updated to a new arc length 416, called β, and the ratio of old and new arc length is used to update the building variables 414, as in FIG. 17, Equation 20.

The linear transformation 314 is followed via the path 316. The path 316 returns the process 219 to the path 234 entering the steady state. The process 219 iterates to the mapping 300 of building variables 414 to the summation coefficients of the linear system of equations, FIG. 13, Equation 7.

When the test 310 results in a negative result, no further augmentation or editing of the curve 400 is needed. Therefore, the control variables 401 are stored 318, typically in the memory device 204 or the storage device 212. However, in an alternative embodiment, the building variables 414 may be saved. However, the method 219 requires the more extensive processing of the continuous transient 226 or discrete transient state 230 only once at the beginning of creation and rendering of a curve. Thus, the storage requirements for the control variables 401 are less. Moreover, since so much of the legacy art stores control variables 401, such storage may be preferred for simplicity and reduced storage requirements.

Figure 10:
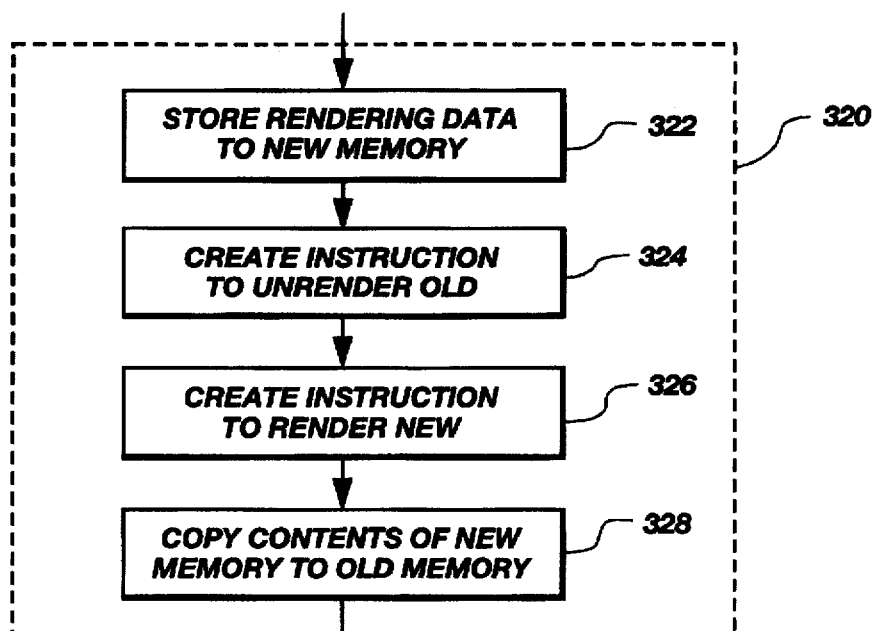
FIG. 10 is a block diagram of one alternative embodiment for managing rendering data according to the invention.

Referring now to FIG. 10, the output 280 of the rendering data (see also FIG. 8) may include a variety of means for updating 320 data files. Likewise, the sending 306 of rendering data during steady state 240 operation (see FIG. 9) may include updating 320 data files. In one presently preferred embodiment for example, a new memory 205A, old memory 205B, general memory 205C, and an event queue 205D may be partitioned or otherwise provided in the memory device 204. Updating may include storing 322 the rendering data for a curve 400 in the new memory 205A. The processor 202 or an equivalent in the output device 210 may then create 324 an instruction for the output device to unrender from the output device 210 the image associated with the old data stored for the curve 400. Next follows the creation 326 of an instruction to render to the output device 210 the image associated with the new data stored for the curve 400. Finally, the contents of the new memory 205A are copied 328 into the old memory 205B. The content of the old memory may be used, for example, to refresh an image of the curve 400 on a monitor screen associated with the output device 210. Other means may be successfully used, but the steps illustrated for updating 320 minimize the delay between the unrendering of the image associated with the old data and the rendering of the image associated with the new data for the curve 400.

Figure 11:
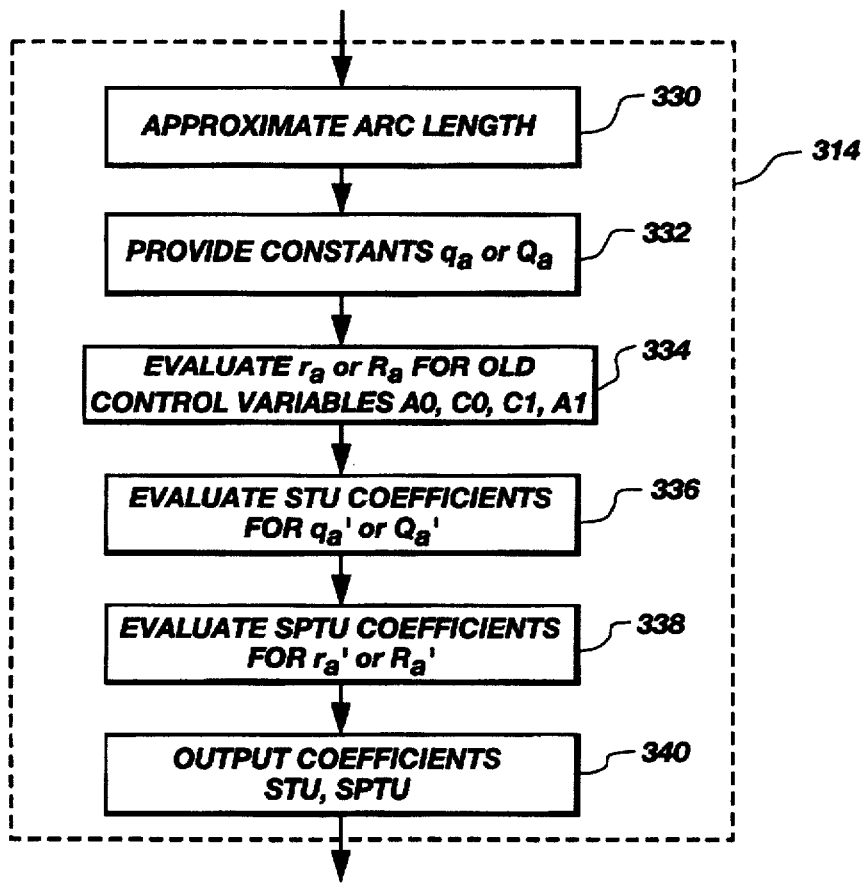
FIG. 11 is a block diagram of one embodiment of a method of linear transformation in accordance with the invention.

Referring now to FIG. 11, linearly transforming 314 (see also FIG. 9) the building variables 414 may include the step of approximating 330 a new value for arc length 416. (See, e.g., FIG. 17, Equation 20.) Evaluating 332, 334 new values of other building variables 414 (see e.g. FIG. 17, Equations 22, 24) may then follow in any appropriate order. The coefficients (see e.g. FIG. 18, Equations 25) are evaluated 336, 338 once building variables 414 are substituted into the coefficients of the linear system of equations (see e.g. Equation 7). The values of the coefficients may then be output 340 so that the system of equations may be solved for the new value if the control variables 401.

Figure 3:
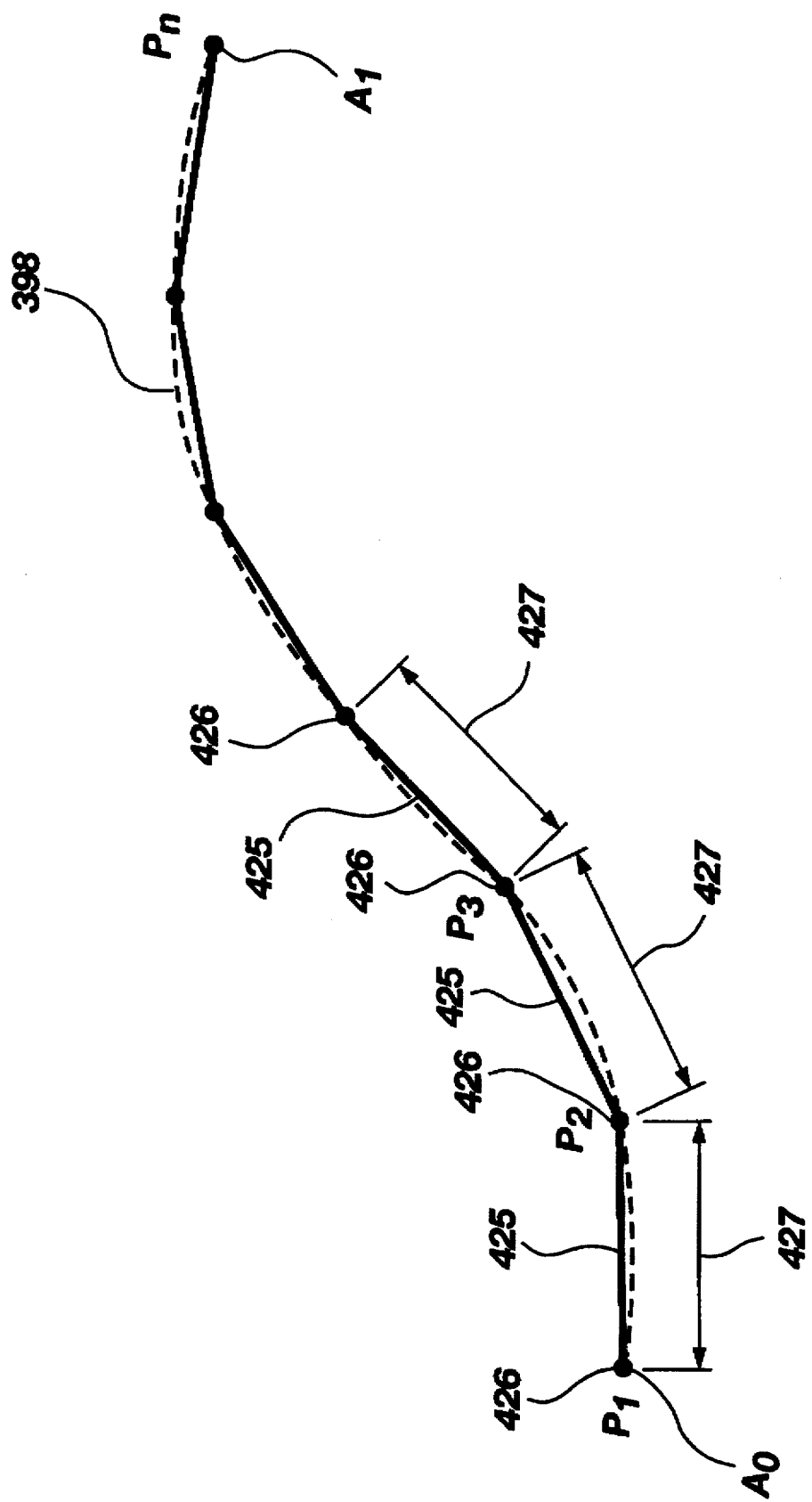
FIG. 3 is a schematic of an image of a curve suitable for input, such as by sampling according to the invention.

In one embodiment contemplated in accordance with the invention, the approximation 330 of arc length 416 may be done using a chords 425 (see e.g. FIG. 3, FIG. 17, Equation 20). In the example, one may provide 332 constants $q_a$ or $Q_a$, and evaluate 334 $r_a$ or $R_a$, depending on whether the curve was generated or synthesized, respectively, as discussed. The summations of t and u terms may be called STU coefficients 436, and the summations of $P_i$, t, and u terms may be referred to as SPTU coefficients 438. Thus, one may evaluate 336 STU coefficients 436 for a new $q_a$ or $Q_a$, and evaluate 338 SPTU coefficients 438 for a new $r_a$ or $R_a$, for a generated or synthesized curve 400. The output 340 of new STU and SPTU coefficients, 436, 438, respectively, is used to create a new vector matrix equation (e.g. Equation 7) having the control variables 401 as the only unknowns.

Figure 6:
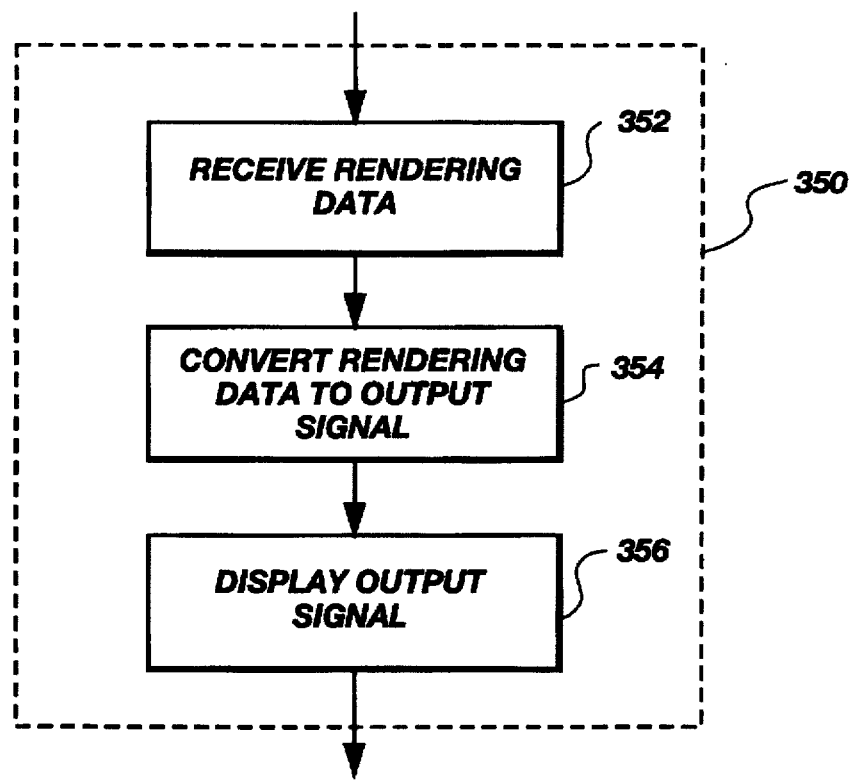
FIGS. 6–9 are block diagrams of details from the method of FIG. 5.

Referring now to FIG. 6, the output device 210 may be selected from one of a variety of available devices. Similarly, the output device 210 may be controlled in numerous ways. In one embodiment, the rendering 350 of the curve 400 by the output device 210 is a response to the output 280 or 306 of the processor 202. Rendering may include receiving 352 the rendering data, converting 354 the rendering data to an output signal, and displaying 356 the output signal. For example, the rendering data may be received by the output device polling the bus 206, or by direct transmission from the processor 202, or the processor 202 may control the output device 210 directly. The conversion 354 of the rendering data may involve converting numerical data to a signal on a Cathode Ray Tube (CRT) or other display, but may also include any type of sensible signal including pressure and visible light intensity of an image. Similarly the display may be any signal that may be received for purposes of feedback so that the curve 400 may be augmented as needed or desired.

EXAMPLE I

Although many types of representations of curves exist, a Bézier curve is one popular type of representation. What is discussed here for a Bézier curve (sometimes simply referred to as a Bézier), may be applied to curves of a wide variety of types. However, in one preferred embodiment of the invention, a Bézier curve may be used. Thus, references herein to Bézier curves may be regarded as specific examples of a generalized method and apparatus for creating curves, as appropriate. Similarly, references to curves may be applied to a Bézier as a specific embodiment as appropriate.

An apparatus and method practiced according to the invention may rely on a Path-Defined Bézier (PDB). The invention may use any suitable Path-Defined Curve (PDC). The method of the invention may be applied to many PDCs, PDBs being a specific example.

Figure 4:
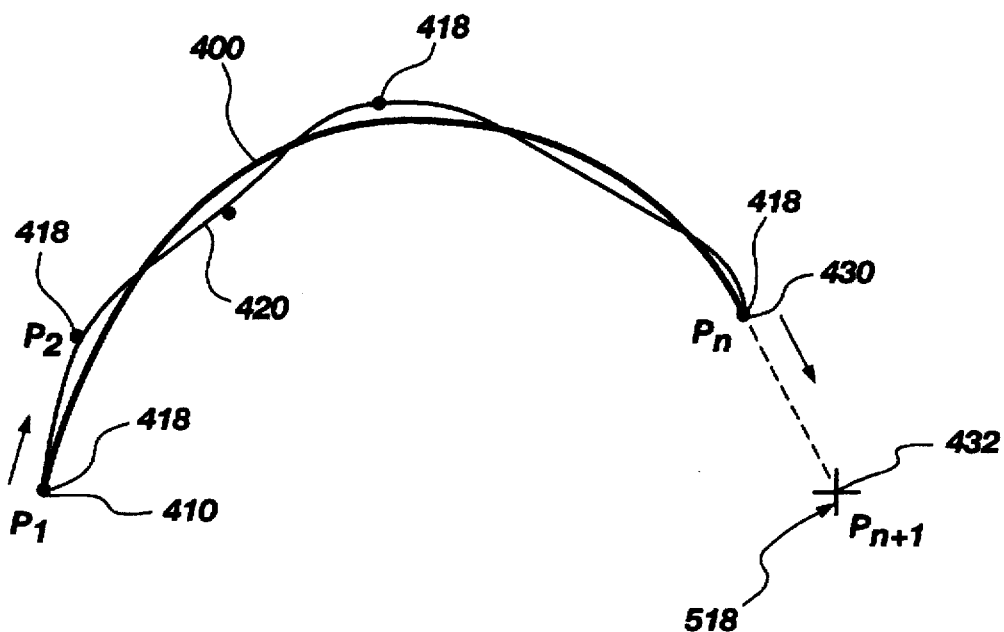
FIG. 4 is a schematic of a curve fitted to a path input by a user, and then augmented by a user with an additional point.

Referring to FIGS. 2–4, a method and apparatus implemented in accordance with the invention may be applied to a curve 400 represented as a two dimensional, non-rational, cubic Bézier segment. Two anchor points 402, 408 ($A_0$ and $A_1$) may be chosen to coincide with the starting 410 and ending 412 points of the curve 400, respectively, and two control points 404, 406 ($C_0$ and $C_1$) govern the shape between the endpoints 410, 412. A set of building variables 414 is created, including the arc length α416 of the curve 400 and also, $q_a$ and $r_a$ (see FIG. 15, Equation 14, and FIG. 16, Equation 18). The building variables 414 are algebraic sums which replace a series of powers of $P_i$, t and u (see FIG. 15, Equation 15, and FIG. 16, Equation 19). The summation terms are used to adjust the curve 400 during creation and editing without recomputing the curve 400 "from scratch," and thus facilitate updating in real time.

One goal of using a least-squares error approach is to produce and present to a user an image of a curve that smooths and closely approximates a user-specified path 420. For example, the curve 400 of FIG. 2 illustrates the relationships of the "control variables" 401, including points $A_0$ and $A_1$, the anchor points 402, 408, and $C_0$ and $C_1$, the control points 404, 406. Bolded letters herein indicate vector quantities having ordered sets (e.g. pairs, triples) of numbers, each number corresponding to a value of a variable in one dimension of the vector. A method and apparatus in accordance with the invention may define the control variables 401 ($A_0$, $C_0$, $C_1$, $A_1$, 402, 404, 406, 408, respectively) based upon points 418 along a path specified by a user.

Referring to FIGS. 2 and 12, the curve 400 may be represented as a third degree (cubic) parametric curve Bez (t)=$u^3 A_0 + 3tu^2 C_0 + 3t^2 u C_1 + t^3 A_1$ in t where u=(1−t), and the parameter t varies such that t=0 at $A_0$, and t=1 at $A_1$. (See Equation 1 in FIG. 12.)

A piecewise linear approximation of the arc length α416 of a curve 400 may be derived from the lengths 422 of chords 425 between points $P_1$, $P_2$, etc. 426. Thus, a linear approximation of the arc length α416 of the resulting curve 400 is the sum of chord lengths 422, the sum of the distances between each pair of adjacent points 426. (See FIG. 12, Equation 2.) From this sum of chord lengths 422, a knot vector kv may be formed by normalizing each partial chord length. Each partial chord length is the sum of all preceding piecewise linear distances 422 between the points 426 from the first cursor location to the location in question (e.g. $A_0$ to the point 426 in question; see FIG. 12, Equation 3). Each partial chord length is divided by the final partial chord length. That is, the final partial chord length is the total of all chord lengths 422 from the first cursor location to the last (e.g. $A_0$ to $A_1$). These ratios of partial chord length to final partial chord length define each term $kv_i$ of the knot vector.

The anchor ($A_0$,$A_1$) 402,408 and control ($C_0$, $C_1$) 404, 406 points for the cubic Bézier may be determined from the error between the fitted curve 400 and each of the input points 418 in the user-specified path 420. The error may be represented as the distance 428 between a point 418 and its corresponding location on the curve 400, and particularly a Euclidean distance. For a vector, the Euclidean distance corresponds to the length (see FIG. 13, Equation 4) of the component or constituent vector in each dimension between the input point $P_i$ and the corresponding point at $t_i$ on the computed Bézier curve 400. Note that $t_i$=$kv_i$ (FIG. 13, Equation 9). See Equation 4, FIG. 12 for the sum of the squared errors between the approximation curve 400 and the points $P_i$ 418 defined by user input.

Referring now to FIGS. 12–22, and more particularly FIGS. 12–16, the method of least squares may be invoked to determine the least squared error. Partial derivatives (rates of change of the error expression of FIG. 13, Equation 4) may be taken with respect to each of the variables and set equal to zero to identify locations of minimum error. (See, e.g. FIG. 13, Equations 5 and 6) The resulting system of equations (FIG. 13, Equation 7) may be solved for the control variables 401 (e.g. 402, 404, 406, 408).

The dependent variables may be selected to be the two anchor points 402, 408 ($A_0$, $A_1$) and the two control points 404, 406 ($C_0$, $C_1$), resulting in a system of four linear vector equations with four unknown vectors. However, a method in accordance with the invention is contemplated to use the inputs (e.g. points $P_i$ 418) specified by a user to define the points $A_0$ and $A_1$, reducing the degrees of freedom to two vectors. That is, the method of the invention may require that $A_0$ and $A_1$ be points actually on a path 420 sketched by a user, effectively constraining or clamping the anchor (end) 402, 408 points $A_0$ and $A_1$ of the fitted curve 400 to coincide with the starting and ending locations of the user-specified path 420. With these two variables known, a system of equations may be reduced to two linear vector equations with two unknown vectors ($C_0$, and $C_1$) represented in matrix form in Equation 7 of FIG. 13.

Any of a number of techniques for solving a system of linear equations may be employed to determine the values for $C_0$ and $C_1$. In practice, Cramer's Rule has been found to produce sufficiently precise results. Thus, the four points 402, 406, 408, 404 required to define the curve $A_0$, $C_0$, $C_1$ and $A_1$ are known from points $P_i$ 418 sampled along the path 420 specified by a user.

A curve 400 in general, and more particularly a Bézier curve, may be fit to the first n points 418 sampled from a path 420 determined by a user through some set of input data. A method and apparatus of the invention may be used to efficiently augment (e.g. edit, extend, etc.) a previously defined curve 400. For example if a user desires to extend a curve 400 with an n+1$^{st}$ point 432 in the path 420, as depicted in FIG. 4, one approach would be to repeat, for n+1 points 418, the process outlined above for n points 418.

However, to provide meaningful feedback to a user requires re-rendering the curve 400 on an output device 210 sensible to the user upon the addition of each point $P_{n+1}$ 432. Updated control variables 401 $A_0$, $C_0$, $C_1$, $A_1$, and the re-rendered representation of the resulting curve 400, need to be computed quickly to be most useful. Feedback to the user should be "instant." "Instant" or in "real time," may be thought of as taking less time than the user requires to designate another point. Alternatively, real time may be used to mean any time less than that required for a user's eye or other involved sensory perception to detect a change in the curve.

A simple re-calculation approach will take longer with the addition of each point. As a curve 400 becomes longer, the approach used to initially define the curve 400 may become too slow to be considered "interactive" by a user. The processor 202 programmed to execute the method may fail to provide a response in real-time. The method cannot be expected to provide the interactive fluidity of motion required for timely feedback to a user sketching a curve 400, for example.

A method corresponding to the invention therefore provides for incremental curve fitting in constant time. That is, for example, no more time is required for augmenting a curve with an n+22$^{nd}$ point, than is required for an n+2$^{nd}$ or n+1$^{st}$ point 432. Also, after the curve 400 has once been created, the curve 400 may be recreated and re-rendered to incorporate a new n+1$^{st}$ point 432 in the same amount of time, regardless of what value n has.

The majority of the computational burden of the fitting method above arises from the calculation of the summation STU 436 and SPTU 438 coefficients, where STU 436 is the summation of t and u terms of FIG. 14, Equation 12 and SPTU 438 is the summation of P, t, and u terms of FIG. 16, Equation 16. These summations 436, 438 for n+1 points are nearly identical to those for the n points used in determining the curve 400 for n points 418. The principal difference is that the t and u values are scaled by a different arc length α416. By simply scaling the values of the previous summations 436, 438, one need not re-calculate them by the original method again. The net result is a constant time method for incrementally updating any curve 400 that may be linearly "scaled" this way. In particular, the example of a cubic Bézier curve operates in this way. Upon the addition of the n+1$^{st}$ point 432, intermediate variables, called "building variables," 414 are calculated for defining the curve.

A suitable set of building variables 414 may include arc length 416 (α, β), calculated with sufficient accuracy by adding chord lengths between the discrete points 418 $P_i$ along the curve.

Also, the building variables 414 $q_a$ (of FIG. 15, Equation 14) and $r_a$ (of FIG. 16, Equation 18), may be defined so as to map the summation terms 436, 438 (coefficients of $A_0$, $C_0$, $C_1$, and $A_1$ in FIG. 13, Equation 7) into linear equations in $r_a$ and $q_a$. (See FIG. 15, Equations 15, and FIG. 16, Equation 5.)

That is, the knot vector kv of FIG. 12, Equation 3 is normalized by arc length α416 (see FIG. 14, Equation 9), where $t_i$ and $u_i$ are defined as in FIG. 14, Equations 8–10 as the normalized Euclidean distance $s_i$ between points 418.

Note that the expansion of Equation 13 is an example of how the summation terms 436, 438 of Equation 12 are re-cast as the linear equations 15 in $q_a$, where $q_a$ is defined in Equation 14. A similar substitution for the summation terms involving t, u, and P results in Equations 19 in $r_a$. (See, e.g. Equations 16–17, where $r_a$ is defined in Equation 18.)

Thus the expression of a curve 400 may be transformed to be linear in building variables 414 $q_a$ and $r_a$, resulting directly from normalizing the curve by arc length α.

Thus, once a curve 400, such as a Bézier, has been fitted to a set of points 418 or has otherwise been defined by its control variables 401 $A_0$, $C_0$, $C_1$, and $A_1$ (402, 404, 406, 408, respectively), a set of building variables 414 $q_a$, $r_a$ may be defined. Based on those building variables 414 $q_a$, $r_a$, a new set of linear algebraic equations 15, 19 may be substituted for non-linear parametric equations FIG. 14, Equation 12, and FIG. 16, Equation 16 in t and u. Thus, the coefficients in the matrix Equation 7 are simple, linear, algebraic expressions in $q_a$ and $r_a$.

The building variables 414 $q_a$, $r_a$, α may be updated, transforming the curve 400 to reflect the changes introduced by the addition of the n+1$^{st}$ point 432 to a set of n points 418. With the updated building variables 415, the summation terms 436, 438 of Equation 7 may be redefined for use in Equations 15, 19 for the $q_a$ and $r_a$ defined in Equations 14, 18. Then solving the matrix equation 7 recomputes a new least-squares error fit curve, such as the Bézier curve.

That is, referring to FIG. 17, the building variables 415 $q'_a$ (Equation 22) and $r'_a$ (Equation 24) are actually linear transformations of $q_a$ (Equation 14) and $r_a$ (Equation 18), respectively, rather than lengthy, time consuming re-calculations. New "updated" building variables 415 $q'_a$ and $r'_a$, defined in Equations 22 and 24, may be substituted directly into equations 15 and 19 for $q_a$ and $r_a$, respectively, to define the coefficients of Equation 7.

Note that β in Equation 20 represents a new arc length (see e.g. Equation 2, α for n points) for n+1 points. Updating α to β is accomplished by adding to the arc length α the length of a chord segment from the old $A_1$, the n$^{th}$ point 430 of FIG. 4, to the new $A_1$, the n+1$^{st}$ point 432.

The linear transformation of $q_a$ and $r_a$, into $q'_a$, and $r'_a$, respectively, is illustrated in Equations 21 and 22, and Equations 23 and 24, respectively. The linear algebraic equations for the coefficients of Equation 7 in terms of $q'_a$, and $r'_a$ are illustrated in Equations 25. Note that Equations 25 in the updated building variables 415 $q'_a$, and $r'_a$ are identical in form to Equations 15 in the original building variables 414 $q_a$ and $r_a$.

In general, for any fitted curve susceptible to such a linear transformation of summation coefficients, and specifically a Bézier curve, the curve may be incrementally extended, augmented, edited, or the like without recalculation of the building variables 414 from the original summations. The new curve 400 resulting from a new solution of the matrix Equation 7, based on the incrementally built summation terms of Equation 25, is equivalent to that which would result from refitting all n+1 points 418 according to the method outlined for the original fitting of n points 418.

In the method of augmentation described in equations 20 through 25 of FIGS. 17 and 18, the building variables 414 $q_a$, $r_a$, and α are retained throughout the path-specification (curve-drawing) process. Once a path 420, curve 400, or Bézier curve has been completely specified, there is no need to retain in the memory device 204 or storage device 212 the building variables 414. Virtually any curve 400 may be represented by a sequence of cubic Bézier segments. Then, once defined, any Bézier curve may be reconstructed at any later time from the stored control variables 401 $A_0$, $C_0$, $C_1$, and $A_1$, (402, 404, 406, 408, respectively), just as a traditional Bézier curve. This is true regardless of the type of curve 400.

However, if a user later decides to further extend the curve 400 (or, for that matter, any other previously drawn curve), the lack of the building variables 414 does not preclude real time augmentation (e.g. editing, extension).

The summation terms of the least-squares error fitting process are based on a finite sequence of discrete locations, points $P_i$ 418. When only a basic Bézier curve exists, neither the building variables 414 nor the sequence of points $P_i$ 418 from which it was derived are available. One way to regenerate the building variables 414 would be to sample the curve 400 to obtain a sequence of points $P_i$ 418. Building variables 414 could be constructed as outlined heretofore.

However, a method and apparatus according to the invention contemplate using integrals instead of summations (coefficients) STU 436 and SPTU 438. Integration of integrals is equivalent to sampling continuously instead of discretely. The method contemplates synthesis of the $q_a$, and $r_a$ building variables 414 to readily provide the benefits of the invention to manipulation, augmentation, and editing of curves 400 created by systems, methods and apparatus not related to the invention.

Referring to FIG. 3, one approach to determining the arc length 416 of a curve 400 is to integrate the length of a chord 425 of infinitessimal length 427 between successive points 426 along the curve 400. (See FIG. 19, Equation 26.) No closed-form solution to such an integral is known. Using a summation of the lengths 427 of the chord 425 between the sampled points 426 to obtain an approximation of the arc length requires knowing where and at how many locations to evaluate the curve 400 to gain sufficient accuracy.

Figure 27:
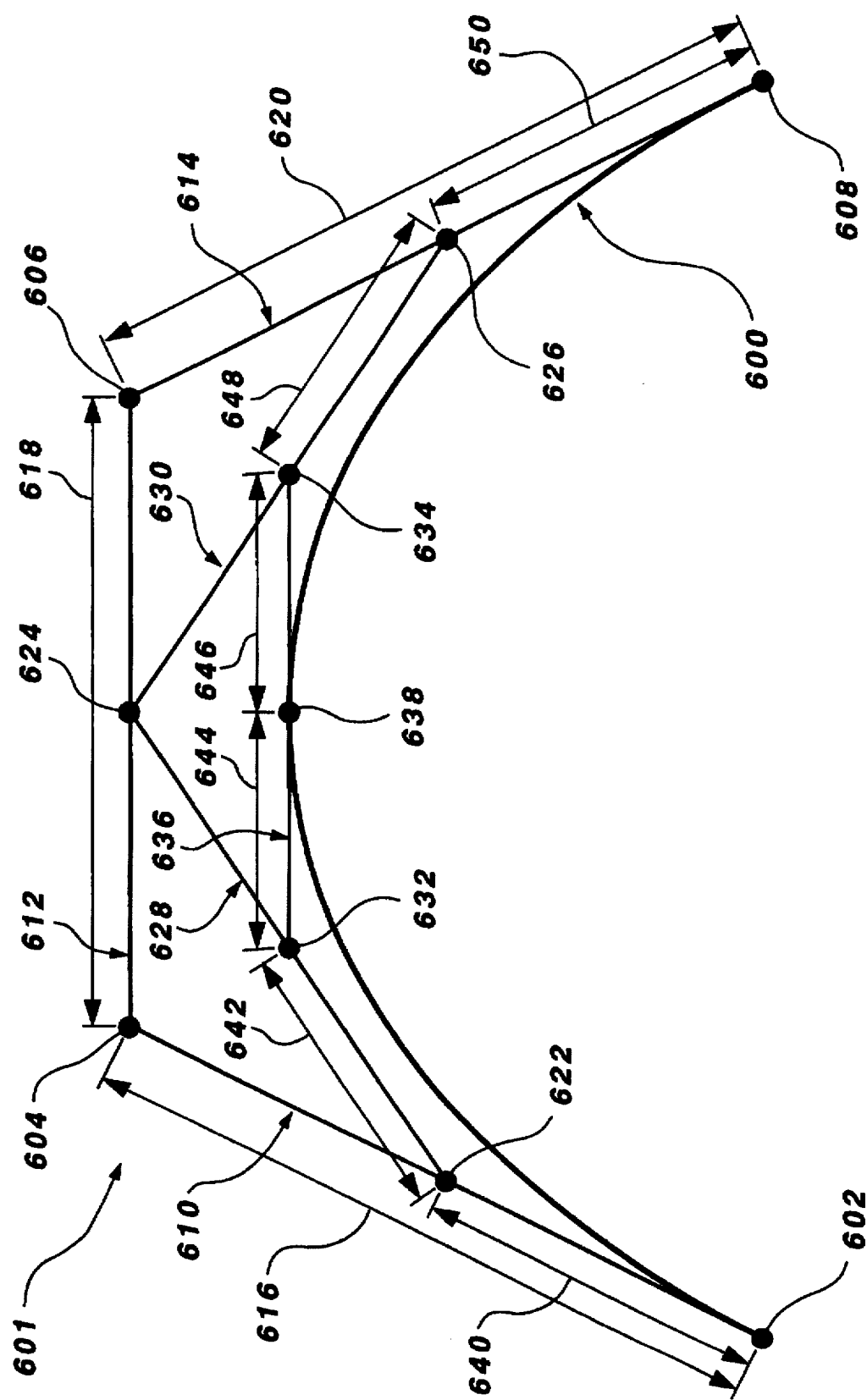
FIGS. 27 and 28 illustrate a schematic of a curve and a method of approximating the arc length of the curve by a recursive method according to the invention.
Figure 28:
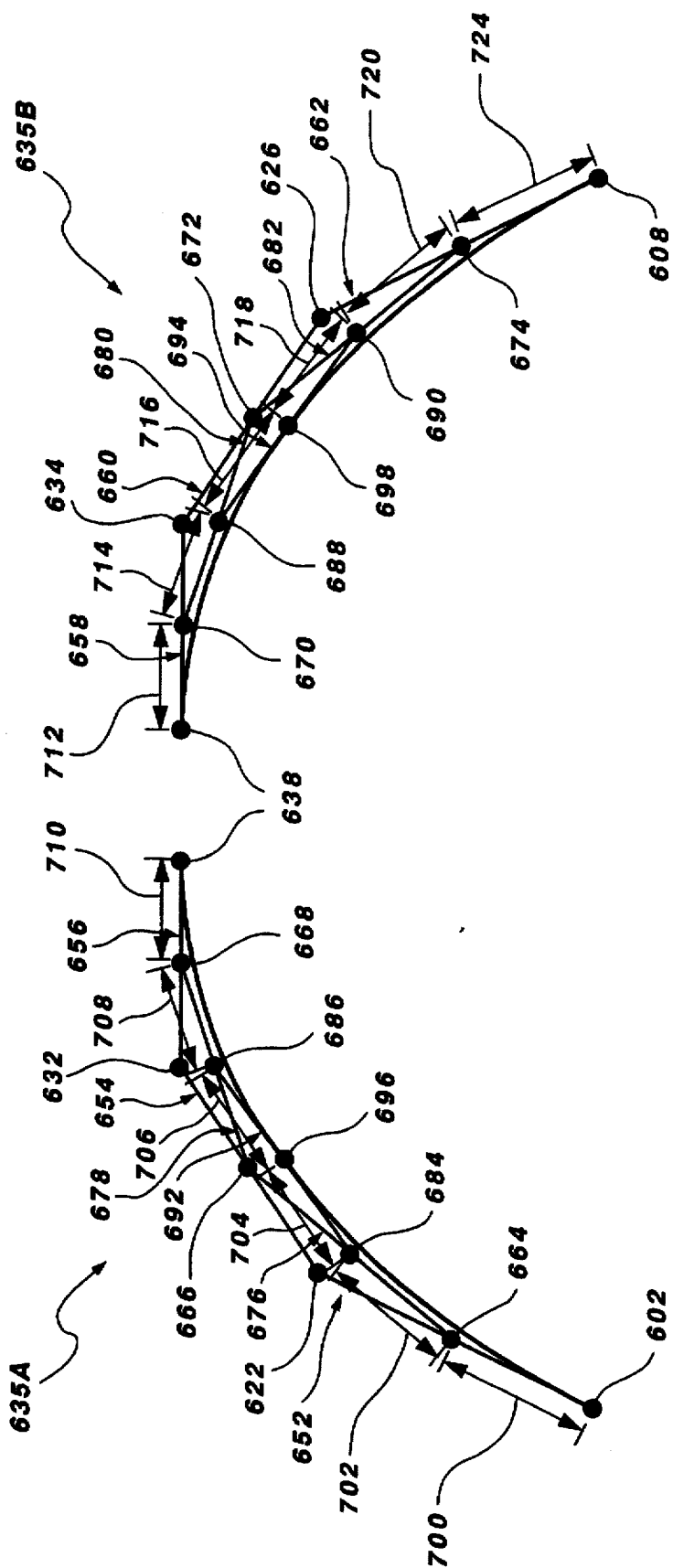

One approach contemplated by the method and apparatus of the invention for approximating the arc length α416 uses the piecewise length of recursively subdivided shells, an open portion of a convex hull. This method of convex shells is illustrated in FIGS. 27 and 28 and discussed below. The method involves creating an envelope about a curve, the chords between midpoints of chords forming a "shell" whose aggregate shape approximates the shape of the curve and whose combined length approximates the length of the curve. A recursive process automatically adapts the shell to the local shape of a curve, automatically subdividing more in the regions of greater curvature. With this approach, one may specify the desired accuracy and the calculation of an approximation to the arc length can be stopped when the desired accuracy is obtained.

Actually, $q_a$ is a summation of $t^a$ terms, as evidenced by Equation 27 (a substitution of Equation 9 into Equation 14). The problem of summing terms containing powers of the n discrete values of t may be represented exactly as a continuous, definite integral of each of the powers of t over the range [0, 1], the entire domain of the parametric variation of t. That is, the values of t are normalized to this range while the values of s are scaled by the actual length 416 of the curve. An added advantage of transforming the discrete problem into continuous integration of a definite integral is that the values of $Q_a$ are constants that do not require repeated computation. As illustrated in FIG. 20, Equations 29–34, each $Q_a$ becomes a simple fraction.

Similarly, as illustrated in FIG. 21, Equation 35 equates $r_a$ to a summation of $Pt^a$, by a substitution of Equation 9 into Equation 18. These discrete summations may also be transformed into a continuous, definite integral evaluated for a function over the range [0,1] as illustrated in Equation 36. Bez(t) represents values of infinitely many points 426 (see FIG. 3) from an existing continuous curve 400 rather than the finitely many discrete P locations or points 418 from a path 420 that a curve 400 may approximate in FIG. 2.

Equation 36 produces simple algebraic equations in the control variables 401 that are functions of the anchor ($A_0$, $A_1$) 402, 408 and control points ($C_0$, $C_1$) 404, 406 of the existing curve 400. (See FIG. 22, Equations 37–39.) The constants $Q_a$ and the easily computed values for $R_a$ are defined in terms of the old $A_0$, $C_0$, $C_1$, and $A_1$ (402, 404, 406, 408, respectively). $Q_a$ and $R_a$ may be used directly in Equations 15 and 19 (FIGS. 15, 16) in place of $q_a$ and $r_a$, respectively, to calculate the summation terms STU 434 and SPTU 436 for the solution of the matrix Equation 7 of FIG. 13. Equation 7 then is solved for new values of $C_0$, and $C_1$, where $A_0$ is the original $A_0$, and $A_1$ is the new end point 432 to which the curve 400 has been extended.

EXAMPLE II

Figure 24:
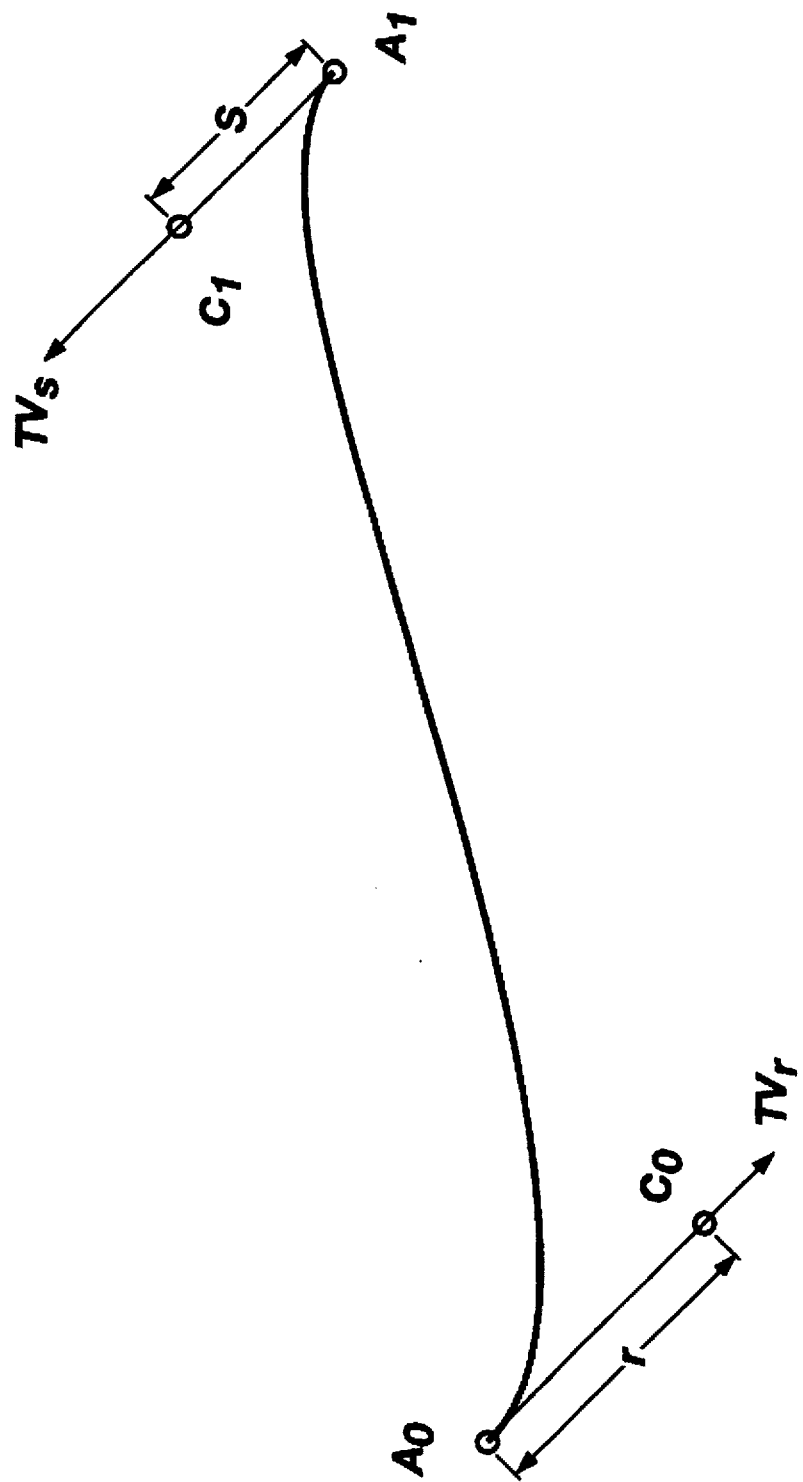
FIG. 24 is a schematic of an alternative embodiment of a curve suitable for use in a method and apparatus according to the invention.

Referring to FIG. 24, a definition of a curve 400 may use, for example, control points $C_0$ 404 and $C_1$ 406. The definition may impose tangency constraints on the placement of these control points 404, 406. Tangency constraints on the placement of these control points 404, 406 ensure continuity at segment joints. This is shown graphically in FIG. 24.

Here, $C_0$ is constrained to lie along the tangent vector $TV_r$ and $C_1$ is constrained to lie along a tangent vector $TV_r$. $TV_r$ and $TV_s$ may be unit vectors. (See e.g. FIG. 25, Equations 40–41.) In FIG. 25, Equation 42 defines a curve, where Equations 40–41 have been substituted in Equation 1 of FIG. 12.

Equation 46 of FIG. 26 represents a system of linear scalar equations in two unknown variables, where Equation 43 of FIG. 25 represents the total of squared errors. That is, Equation 42 has been substituted into Equation 4 of FIG. 13. In this case, however, partial derivatives are taken with respect to r and s in Equations 44 and 45. Equation 46 submits to Cramer's Rule, yielding solutions for r and s, which may be used to calculate $C_0$ and $C_1$ (see Equations 40, 41, FIG. 25). Again, $A_0$ and $A_1$ may be selected to be the first 410 and last 412 points in the sequence of points 418 on a path 420 specified by a user. Thus, many curves 400 that can be represented by a system of equations, where the system of equations is linearly transformable, may be used to directly and interactively render a curve 400 on an output device 210 in real time in accordance with the method and apparatus of the invention.

Thus, other types of curves 400 may be used, and the control variables 401 may be entirely different than those of the example. By suitable choices of mathematical functions, a user may select a type of curve 400 with some kind of control variables 401. A user may also select building variables 414 to create a system of linear equations wherein the building variables 414 may be updated by a simple, linear transformation. The examples show methods to do so with the purpose of reducing the time required by an input device 208, processor 202, and output device 210 to update a rendering of a curve 400 on an output device 210. Thus, by use of a method and apparatus in accordance with the invention, a user may create and edit a curve directly, and interactively, in real time.

EXAMPLE III

Referring to FIG. 27, a method for rapid approximation of arc lengths has been developed and implemented according to the invention. The method relies on a recursion formula analytically representing a convex shell 601 for approximating a curve 600. The control points 602, 604, 606 and 608 may correspond to control variables 401 corresponding to the curve 600, as heretofore described for the curve 400. The shell 601 comprises legs 610, 612 and 614 extending between the control points 602, 604, 606, and 608. A first approximation of the arc length 416 (see FIG. 2) of the curve 600 is determined by computing the piecewise length of the shell 601 by summing the lengths 616, 618, and 620 of the legs 610, 612 and 614, respectively.

Applying the de Casteljau method, the curve 600 and its corresponding shell 601 are subdivided. The midpoints 622, 624, 626 of the legs 610, 612, 614, respectively, are determined analytically. The midpoints 632, and 634 are determined for the webs 628 and 630, respectively, extending between the midpoints 622, 624, and 624, 626, respectively. The midpoint 638 is determined for the web 636 extending between the midpoints 632 and 634. As a result of this subdivision, two new shells 635A, 635B (subshells) have been formed, shown separated in FIG. 28.

The logical left shell 635A,(or subshell 635A, for short, with respect to the shell 601) resulting from the subdivision, comprises legs 652, 654, 656 extending between the control points 602, 622, 632, and 638. The logical right shell 635B, (subshell 635B, with respect to the shell 601) resulting from the subdivision, comprises legs 658, 660, 662 extending between the control points 638, 634, 626, and 608.

A second approximation of the arc length of curve 600 is determined by summing the piecewise lengths of each of the two shells 635A, 635B resulting from the subdivision. The piecewise length of the logical left shell 635A is determined by summing the lengths 640, 642, 644 of the legs 652, 654, 656, respectively. The piecewise length of the logical right shell 635B is determined by summing the lengths 646, 648, 650 of the legs 658, 660, 662, respectively. The piecewise lengths of the legs 646, 648, 650, 658, 660, 662 of the logical left and right shells 635A, 635B, respectively, are summed to produce the second approximation of the arc length of curve 600.

Thus, the method described for the shell 601 is repeated for the shells 635A, and 635B, as needed. For the logical left shell 635A, the points 602, 622, 632, and 638 correspond to points 602, 604, 606 and 608, while the points 664, 666, and 668 correspond to the points 622, 624, and 626, respectively. The points 684 and 686 correspond to points 632 and 634. The point 696 corresponds to the point 638. Likewise, the legs 652, 654, and 656 correspond to the legs 610, 612, and 614, where the lengths 700, 702, 704, 706, 708, and 710 correspond to lengths 640, 642, 644, 646, 648, and 650, respectively. The webs 676, 678, and 692 correspond, respectively, to 628, 630, and 636.

For the logical right shell 635B, the method described for the shell 601 is repeated. Thus, the points 638, 634, 626, and 608 correspond to points 602, 604, 606 and 608, while the points 670, 672, and 674 correspond to the points 622, 624, and 626, respectively. The points 688 and 690 correspond to points 632 and 634. The point 698 corresponds to the point 638. Likewise, the legs 658, 660, and 662 correspond to the legs 610, 612, and 614, where the lengths 712, 714, 716, 718, 720, and 724 correspond to the lengths 640, 642, 644, 646, 648, and 650, respectively. The webs 680, 682, and 694 correspond, respectively, to 628, 630, and 636.

It can be shown that the second approximation of the arc length of curve 600 is generally less than (and never greater than) the first approximation of the arc length of curve 600. From these two approximations, a relative error term is calculated as the difference between the first approximation and the second approximation divided by the second approximation.

If the absolute value of this relative error term is sufficiently small to meet some predetermined criterion, then the second approximation may be regarded as being a sufficiently close approximation of the arc length of curve 600. If the relative error term exceeds the predetermined criterion, then the method is repeated in a recursive manner on each of the two logical curves and their corresponding shells 635A, 635B resulting from the de Casteljau subdivision in the previous step. The points 602, 622, 632, and 638 become the control variables 401 for the logical left shell 635A, and the points 638, 634, 626, and 608 become the control variables 401 for the logical right shell 635B. It can be shown that the arc length of the curve 600 is always less than or equal to the piecewise length of the legs of the shell 601, the sum of the piecewise lengths of the legs of the shells 635A, 635B, or the sums of subsequent shells so defined.

Thus, the recursion continues until a precision criterion is met. The predetermined criterion is a precision criterion met when the normalized difference between successive approximations of arc length 416 for any shell 601, 635A, 635B, and so forth is less than or equal to that precision criterion.

CONCLUSION

Figure 23:
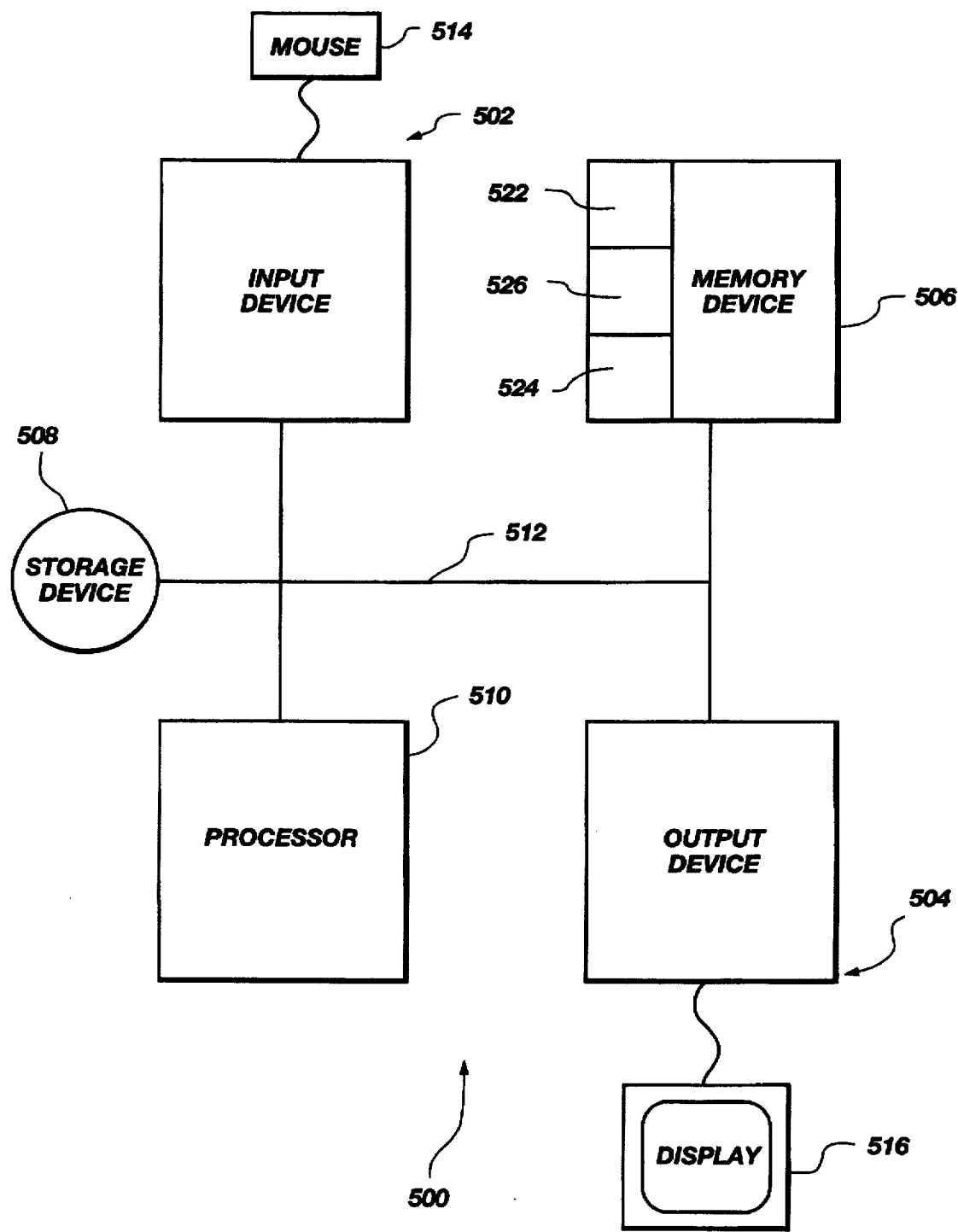
FIG. 23 is a block diagram of one embodiment of an apparatus created and operated according to the invention.

Referring to FIG. 23, an interactive curve drawing tool has been embodied in accordance with the invention as disclosed herein and in Example I. The apparatus 500 in one embodiment included an input device 502, an output device 504, a memory device 506, a storage device 508, and a processor 510. The input device 502 included a mouse 514 as a pointer. The output device 504 included a monitor 516 for displaying images including a cursor 518 representing the relative position of the mouse 514. The processor 510 and the memory device 506 were embodied in an Apple Macintosh computer. The processor 510 included a 33 Megahertz MC68040 processor equipped with a Floating Point Unit (FPU) to maintain accuracy in calculating the summation terms. The processor 510 was programmed to accomplish the executable steps of the foregoing methods in the 'C' programming language.

The embodiment unrendered each curve 400 and rendered the successive, augmented, incrementally computed curve 400. The new rendering was based on each new location of a point $P_{n+1}$ 432 read from an event queue 522 in the memory device 506. In the event queue 522 were stored data points $P_i$ 418 corresponding to a position of the mouse 514 as received in the system event queue 522. Response of this apparatus 500 was virtually instantaneous so far as a user could perceive. The time required by the output device and processor to actually render the Bézier curve on the output device was determined to be the limiting factor in performance.

An embodiment of the method was executed on a computer having 25 MHz MC68030 CPU as the processor 510. Response was notably slower, but still sufficiently fast to render updated curves 400 in real time for most practical purposes. That is, although visually perceptible, processing delays were insufficient to interfere with the interactive fluidity of the feedback of the output device 504 (monitor 516) in response to inputs from a user's movement of the mouse 514 of the input device 502.

To test the dependence upon hardware floating-point coprocessing, the method was embodied in a processor 510 employing code compiled to use SANE (Standard Apple Numerics Environment), a software library of routines for floating-point computation. The method in that embodiment had a response that was still very satisfactory even when using a Motorola MC68020 processor as the processor 510.

A tool programmed on an apparatus 500 and implemented in accordance with the invention may achieve real time performance, including editing and feedback, in real time using a wide variety of available processors 510. Very usable response times may also be achieved using a wide class of slower performing, currently existing processors 510.

The implementation of a prototype of the method and apparatus of the invention demonstrated that such functionality may be realized on modest-to-average desktop computers. Curve drawing tools suitable for inclusion in popular drawing programs may be greatly enhanced by inclusion of a PDC, and specifically a PDB, drawing tool in single and multi-segment embodiments. The method is contemplated to be applied to implicit (automatic) and explicit (user-controlled) segmentation of curves 400. Also, the method may be applied to an editing tool for editing internal portions of existing curves 400. For example, an interior point $P_i$ 426 on a curve may become a new end point $A_0$ or $A_1$, respectively, for each of two portions of the curve 400 on either side of the point 426. Alternatively, an arbitrary interior portion of an existing curve may be redefined according to a method and apparatus of the invention.

Curves 400 may be used to represent many widely differing phenomena including, for example, approximations of data, edges of surfaces, trajectories of guided missiles, ambulatory performance of prosthetic limbs, complex motions of presses and other manufacturing machines, and may control paths of many parameters in dimensions of space, temperature, pressure, or any other physical property. Also, curves 400 may be used in drawing.

A PDB of the example is but a specialized example of a curve. A PDC in general, and a PDB in particular, enables an easier user interface. One reason for the easiness is that the method may enable direct and interactive specification of a curve 400 by a user in real time.

The method may provide an incremental alteration (also called augmentation, or extension) of a curve 400 in real time. Feedback may be visual, as a curve displayed on a screen of a monitor, or by another appropriate, sensible, medium.

What may apply to visual feedback, to an artist or draftsman, for example, may apply to any suitable feedback process. For example, feedback may be sensed by a user through any sensible (perceptible) stimulus. Thus, a curve 400 may be created to represent any process wherein a parameter (e.g. a value representing a heat flow, temperature, pressure, force, motion through space, stress in time or space) varies as a curve. Likewise, feedback of the parameter's value may be delivered to a user by sight, sound, touch or other sensorially perceptible mode.

Thus by use of the method and apparatus of the invention, a curve 400 may be more effectively created, altered, or edited directly, interactively, and in real time, in accordance with the expectations of the creator. Virtually regardless of its origin, a curve may be represented as a Bézier, for example. The Bézier curve may be generated using a "least-squares" curve fitting of specified points 418 marked by a cursor 518 controlled by user. Methods and apparatus in accordance with the invention may be used for synthesizing a Path-Defined Curve from an existing curve, or a Path-Defined Bézier curve from such an existing Bézier curve.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus for rendering a nonlinear curve in real time, the apparatus comprising:

an input device for providing input signals corresponding directly and interactively to locations on a path specified by a user;

a processor for receiving the input signals and providing output data corresponding to a nonlinear curve fitted to the input signals;

a memory device for storing data received from the processor; and an output device for interactively providing, output signals sensible by a user and corresponding to the curve.

2. The apparatus of claim 1 wherein the processor comprises a digital processor for logically operating on the data, and wherein the data comprises digital signals corresponding to a linearly transformable curve fitted to points corresponding to the locations.

3. The apparatus of claim 1 wherein the input device further comprises a pointer adapted to be moved along the path by a user, the input device generating the input signals.

4. The apparatus of claim 3 wherein the output device further comprises an imaging device, the imaging device including a cursor for presenting to a user an image corresponding to a position of the pointer.

5. The apparatus of claim 1 wherein the output device further comprises a rendering device for rendering an image of the curve.

6. The apparatus of claim 5 wherein the curve is selected from cubic curves.

7. The apparatus of claim 5 wherein the rendering device further comprises a screen for rendering an image visible to a user, the image corresponding to the curve and the curve being selected from cubic Bézier curves.

8. The apparatus of claim 1 wherein the processor is a digital processor programmed to directly receive the input signals from an inut device comprising a pointer movable by a user along the path, the digital processor interactively feeding back through the output device in real time an image corresponding to the curve, and wherein the input device is adapted to receive in real time additional input signals reflecting additional movement of the pointer by the user in response to the image, the output device being further adapted to render a second curve in real time reflecting the additional input signals.

9. The apparatus of claim 1 wherein the input signals are comprised of digital signals corresponding to the locations.

10. The apparatus of claim 1 wherein the input signals correspond to spatial coordinates of the locations, the locations corresponding to points sampled at intervals along the path.

11. The apparatus of claim 1 wherein the input signals are comprised of signals corresponding to a continuous curve.

12. An apparatus for interactively feeding back to a user in real time a smoothed output signal in response to an input signal controlled directly by a user, the apparatus comprising:

an input device operable by a user to sense movements by a user and to selectively provide input signals corresponding directly and interactively to the movements along a path;

a processor connected to the input device to receive the input signals for logically operating on the input signals to provide process signals corresponding to a linearly transformable, nonlinear curve fitted to the input signals;

a memory device operably connected to the processor for storing input data corresponding to the input signals and for storing output data corresponding to the process signals; and an output device connected to the processor for receiving output data and for interactively feeding back to a user in real time the smoothed output signals, the smoothed output signals being sensible by a user and corresponding to the output data.

13. The apparatus of claim 12 further comprising an input device controllable by a user to be moveable in space along the path in space selected by the user.

14. A method for incrementally augmenting a path-defined curve in real time, the method comprising:

moving a pointer associated with an input device;

creating input data corresponding to locations along a path specified by a user moving the pointer therealong;

creating in a processor, connected to the input device, process data corresponding to a linearly transformable curve fitted to the inut data;

mapping the process data to building variable data representing a linear system corresponding to the linearly transformable curve;

operating on the building variable data to create output data corresponding to the curve;

feeding back to a user on an output device connected to the processor a first image of the curve;

moving the pointer in response to the image;

providing additional input data from the input device, the added input data corresponding to additional locations from additional movement of the pointer;

linearly transforming the building variable data to create new building variable data for replacing the building variable data; and feeding back to a user, in real time, on the output device, a second image for replacing the first image.

15. The method of claim 14 further comprising:

providing continuation inputs from the input device controlled by a user; and repeating the receiving, linearly transforming, and feeding back according to instruction data corresponding to the continuation inputs.

16. The method of claim 14 further comprising:

repeating the method for each curve of a plurality of curves, the each curve including at least one point in common with another curve of the plurality of curves.

17. The method of claim 14 wherein the creating process data comprises creating process data corresponding to a plurality of linearly transformable curves fitted to the input data, and repeating the mapping through feeding back steps for each curve of the plurality of linearly transformable curves.

18. An apparatus adapted to directly and interactively create a nonlinear curve, the apparatus comprising:

an input device adapted to directly and interactively provide input signals corresponding to locations on a path;

a processor adapted to receive the input signals, to provide output data corresponding to a first curve fitted to the locations, linearly transform the nonlinear curve to create a second nonlinear curve, and to provide output data corresponding to the second nonlinear curve;

a memory device adapted to store the output data; and an output device adapted to interactively feed back the output signals corresponding to the second nonlinear curve.

19. The apparatus of claim 18 wherein the processor is further programmed to store in the memory device a first equation set corresponding to the first nonlinear curve, to linearly transform the first equation set to create a second equation set corresponding to the second nonlinear curve, and to store in the memory device transformed data corresponding to the transformed equation set.

20. The apparatus of claim 19 wherein the processor is programmed to receive at least one editing input signal from the input device and to create a third nonlinear curve corresponding to the input signals and the at least one editing input signal by linearly scaling the second nonlinear curve.

21. The apparatus of claim 20 wherein the third nonlinear curve is created in constant time.

22. The apparatus of claim 21 wherein the processor is programmed to augment the third nonlinear curve to create a fourth nonlinear curve linearly transformed from the third nonlinear curve in constant time.

23. The apparatus of claim 20 wherein the third nonlinear curve is created independent of the number of the at least one editing input signals.

* * * * *